(12) United States Patent
Yasui

(10) Patent No.: US 7,698,051 B2
(45) Date of Patent: Apr. 13, 2010

(54) PLANT CONTROL SYSTEM

(75) Inventor: Yuji Yasui, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 369 days.

(21) Appl. No.: 11/664,703

(22) PCT Filed: Sep. 22, 2005

(86) PCT No.: PCT/JP2005/017498

§ 371 (c)(1),
(2), (4) Date: Apr. 5, 2007

(87) PCT Pub. No.: WO2006/038473

PCT Pub. Date: Apr. 13, 2006

(65) Prior Publication Data

US 2008/0133113 A1    Jun. 5, 2008

(30) Foreign Application Priority Data

Oct. 6, 2004    (JP)    ............... 2004-293276

(51) Int. Cl.
*F02D 41/00* (2006.01)
(52) U.S. Cl. .................. 701/105; 701/108
(58) Field of Classification Search ......... 701/101–105, 701/108, 114
See application file for complete search history.

(56) References Cited

U.S. PATENT DOCUMENTS 5,497,329 A * 3/1996 Tang .................... 701/104
6,279,537 B1 * 8/2001 Yonekura et al. ....... 123/406.48
6,708,097 B1 * 3/2004 Vohmann et al. ............. 701/68
6,755,078 B2 * 6/2004 Hernandez et al. ....... 73/114.74

(Continued)

FOREIGN PATENT DOCUMENTS

JP    57-075306 A    5/1982

(Continued)

OTHER PUBLICATIONS

Hsin-Hsiung Wang et al., International Journal of Adaptive Control and Signal Processing, vol. 13, Dec. 9, 1999, pp. 651-669, XP007909048.

(Continued)

*Primary Examiner*—Stephen K Cronin
*Assistant Examiner*—Johnny H Hoang
(74) *Attorney, Agent, or Firm*—Arent Fox LLP

(57) ABSTRACT

In a system for controlling a plant (engine) 10 having an input u, there are provided with applying device (vibration signal) 100 for applying a component p that changes at a predetermined cycle to the plant, parameter calculating device (Washout Filter) 102 for calculating a parameter h based on an output y of the plant, integrating device (finite interval integrator) 104 for integrating a value j obtained by multiplying the calculated parameter h by the applied component p in an interval of integral multiple of a cycle of the component p, and input calculating devices (infinite interval integrator 106a, multiplier 106b, adder 106c) for calculating the input u based on the integrated value g obtained by the integration. Owing to this configuration, it becomes possible to provide a system that can optimize the output y, while preventing the resonance of the control system while, thereby enabling to control the output of the plant to the extremum point.

4 Claims, 17 Drawing Sheets

U.S. PATENT DOCUMENTS

| | | | |
|---|---|---|---|
| 6,763,708 B2 * | 7/2004 | Ting et al. | 73/114.74 |
| 6,980,902 B2 * | 12/2005 | Nakazawa | 701/102 |
| 7,195,007 B2 * | 3/2007 | Muto et al. | 123/568.22 |
| 7,353,648 B2 * | 4/2008 | Zhang | 60/278 |
| 7,392,129 B2 * | 6/2008 | Hill et al. | 701/105 |
| 2003/0051468 A1 | 3/2003 | Van Nieuwstadt et al. | |

FOREIGN PATENT DOCUMENTS

| | | |
|---|---|---|
| JP | 5-040503 A | 2/1993 |
| JP | 07-503082 A | 3/1995 |
| JP | 2536243 B | 7/1996 |
| JP | 2002-038982 A | 2/2002 |
| JP | 2005-044349 A | 2/2005 |

OTHER PUBLICATIONS

Yaodong Pan, et al. "Extremum Seeking Control of a Variable Valve Timing Engine" IFAC Symposium on Advances in Automotive Control, Salerno, Italy, Apr. 19-23, 2004, pp. 173-178, XP009118958.

* cited by examiner

PLANT CONTROL SYSTEM

CROSS-REFERENCE TO RELATED APPLICATION

This application is a National Stage entry of International Application No. PCT/JP2005/017498, filed Sep. 22, 2005, the entire specification claims and drawings of which are incorporated herewith by reference.

TECHNICAL FIELD

This invention relates to a plant control system, specifically to a plant control system utilizing an Extremum-Seeking-Control.

BACKGROUND ART

In an internal combustion engine, when, for example, ignition timing is controlled at MBT (Minimum Spark Advance for Best Torque), indicated mean effective pressure Pmi, which indicates combustion efficiency, becomes optimum. As shown in FIG. 20, the indicated mean effective pressure with respect to the ignition timing has an extremum characteristic.

Conventionally, such control is conducted by calculating the indicated mean effective pressure using a detected in-cylinder pressure and crank angle, averaging the result, determining the operating condition from the engine speed and load and, based on change of the indicated mean effective pressure when the ignition timing is made varied under the determined operating condition, controlling the ignition timing so that the ignition timing is to be the maximum value of the indicated mean effective pressure, as taught by, for instance, Patent Reference 1. The calculation of the indicated mean effective pressure is explained in Patent Reference 2 in detail.

However, the technique disclosed by Patent Reference 1 is not necessarily satisfactory in terms of control accuracy and response performance and, when a difference between predetermined ignition timing and optimum ignition timing occurs due to the manufacture variance or aging of the engine, the change of fuel property or the like, disadvantageously cannot compensate it.

Meanwhile, a theory called the Extremum-Seeking-Control is proposed as one of control theories, the details of which are described in, for example, Non-Patent Reference 1. The Extremum-Seeking-Control (hereinafter called "ESC") is particularly efficient for searching the extremum in a plant having a non-linear characteristic. When the aforesaid ignition timing control is conducted, for instance, the use of this control theory can improve control accuracy and response performance and also enables to cope with the manufacture variance or aging of the plant, e.g., an internal combustion engine, the change of fuel property or the like. The similar extremum characteristic can be seen in a NOx emission characteristic of an engine, for example.

Patent Reference 1: Japanese Patent Publication No. 2536243

Patent Reference 2: Japanese Patent Publication No. 2695243

Non-Patent Reference 1: Real-Time Optimization by Extremum-Seeking Control (Kartic B. Ariyur and Miroslaw Krsitic: WILEY-INTERSCIENCE, 2003)

In the ESC, an input f for optimizing an output y is calculated by mixing a vibration input (perturbation input) p for detecting the relationship between output change and input change with an input u to be sent to a plant (controlled object), multiplying a change amount h of the output y at that time by the vibration input p and integrating the product.

DISCLOSURE OF THE INVENTION

Problems to be Solved by the Invention

However, the calculation of the optimizing input f using the change amount h is conducted by calculating a correlation function in an infinite interval of h and p. As a result, the optimizing input f exhibits cyclic behavior and the regression of the cyclic behavior in the control loop causes the resonance of p and f, thereby disadvantageously leading to the unstable control system.

Therefore, an object of this invention is to overcome the aforesaid drawbacks and provide a plant control system that optimizes the output y while preventing the resonance of the control system.

Means for Solving the Problems

In order to achieve the object, as recited in claim 1 mentioned below, this invention is configured to have a system for controlling a plant having an input u, comprising: applying means for applying a component p that changes at a predetermined cycle to the plant; parameter calculating means for calculating a parameter h based on an output y of the plant; integrating means for integrating a value j obtained by multiplying the calculated parameter h by the applied component p in an interval of integral multiple of a cycle of the component p; input calculating means for calculating the input u based on the integrated value g obtained by the integrating means; and input means for supplying the calculated input to the plant.

As recited in claim 2 mentioned below, this invention is configured to have a system for controlling a plant having a plurality of inputs u1/u2, comprising: applying means for applying components p1/p2 that change at different cycles to the inputs; parameter calculating means for calculating a parameter h based on an output y of the plant; integrating means for integrating a value j obtained by multiplying the calculated parameter h by the applied components p1/p2 in intervals of integral multiple of the cycles of the components p1/p2; input calculating means for calculating the inputs u1/u2 based on the integrated values g1/g2 obtained by the integrating means; and input means for supplying the calculated inputs to the plant.

As recited in claim 3 mentioned below, the plant is an internal combustion engine, the input of the plant is an ignition timing, and the output of the plant is a parameter that represent a efficiency of the engine.

As recited in claim 4 mentioned below, the plant is an internal combustion engine, the inputs of the plant are an EGR amount and supercharging pressure an ignition timing, and the output of the plant is an exhaust gas sensor installed in an exhaust system of the engine.

EFFECTS OF THE INVENTION

In the plant control system recited in claim 1, applying a component p that changes at a predetermined cycle to the plant, calculating a parameter h based on an output y of the plant, integrating a value j obtained by multiplying the calculated parameter h by the applied component p in an interval of integral multiple of a cycle of the component p, the input u is calculated based on the integrated value g obtained by the integration. Owing to this configuration, by integrating the value in an interval of integral multiple of a cycle of the component p, in other words in a definite interval, it becomes possible to optimize the output y, while preventing the resonance of the control system.

Specifically, although the modern control and robust control cannot effectively control an output of a plant (controlled object) having the extremum characteristic, the ESC makes it possible. In the ESC, however, as described above, since the calculation of the optimizing input f using the change amount h is conducted by calculating a correlation function in an infinite interval of h and p, the optimizing input f exhibits cyclic behavior and the regression of the cyclic behavior in the control loop causes the resonance of p and f, thereby disadvantageously leading to the unstable control system. The integration in the finite interval stated above makes possible to optimize the output y while preventing the resonance of the control system.

In the plant control system recited in claim 2, applying components p1/p2 that change at different cycles to the inputs, calculating a parameter h based on an output y of the plant, integrating a value j obtained by multiplying the calculated parameter h by the applied components p1/p2 in intervals of integral multiple of the cycles of the components p1/p2 and the inputs u1/u2 are calculated based on the integrated values g1/g2 obtained by the integration. Owing to this configuration, by integrating the value in an interval of integral multiple of a cycle of the components p1/p2, in other words in a definite interval, it becomes also possible to prevent the resonance of the control system while optimizing the output y, thereby controlling the output of the plant to the extremum.

Further, although the modern control and robust control cannot effectively control an output of a plant (controlled object) having the extremum characteristic with a plurality of inputs being balanced, the ESC makes it possible. In the ESC, however, since the calculation of the optimizing input f using the change amount h is conducted by calculating a correlation function in an infinite interval of h and p, the optimizing input f exhibits cyclic behavior and the regression of the cyclic behavior in the control loop causes the resonance of p and f, thereby disadvantageously leading to the unstable control system. The integration in the finite interval stated above makes possible to optimize the output y while preventing the resonance of the control system.

In the plant control system recited in claim 3, since the plant is an internal combustion engine, the input of the plant is an ignition timing, and the output of the plant is a parameter that represent a efficiency of the engine, in addition to the above effects, it becomes possible to optimize the indicated mean effective pressure Pmi indicative of combustion efficiency and, even when a difference between predetermined ignition timing and optimum ignition timing occurs due to the manufacture variance or aging of the engine, the change of fuel property or the like, compensate it to consistently optimize combustion efficiency of the engine.

As recited in claim 4 mentioned below, since the plant is an internal combustion engine, the inputs of the plant are an EGR amount and supercharging pressure an ignition timing, and the output of the plant is an exhaust gas sensor installed in an exhaust system of the engine, in addition to the above effects, it becomes possible to, even when balance between the EGR amount and supercharging pressure which minimizes the emission amount of exhaust gas such as NOx, HC and the like varies due to the manufacture variance or aging of the engine, the change of fuel property or the like, compensate it to consistently optimize combustion efficiency of the engine.

BEST MODES OF CARRYING OUT THE INVENTION

Preferred embodiments for carrying out a plant control system according to the present invention will now be explained with reference to the attached drawings.

First Embodiment

Figure 1:
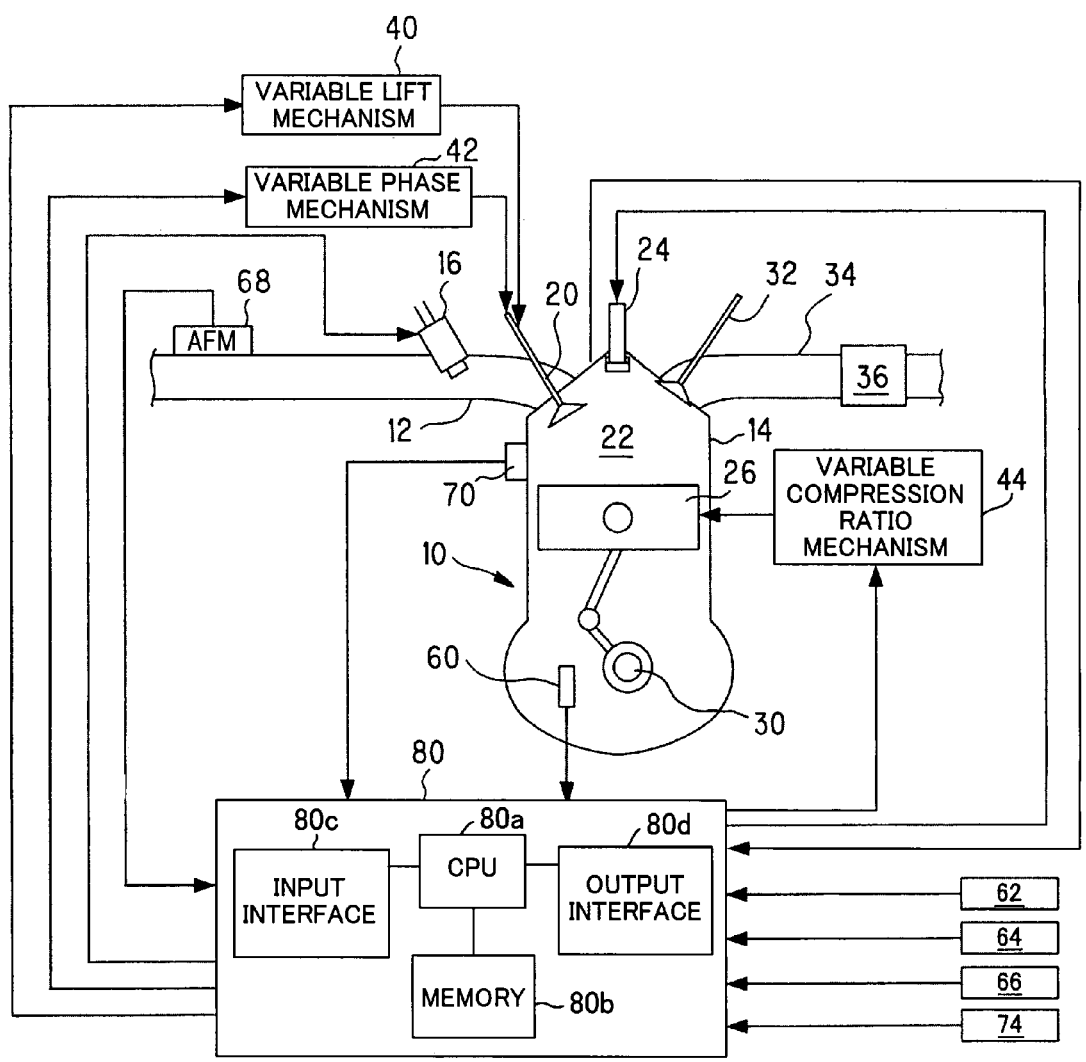
FIG. 1 is a schematic diagram showing a plant control system according to a first embodiment of this invention.

FIG. 1 is a schematic diagram showing a plant control system according to a first embodiment of this invention.

It should be noted that a control system of an internal combustion engine, more specifically a system that controls intake air quantity while controlling ignition timing so as to maximize the efficiency in terms of the intake air quantity in an internal combustion engine, is taken as an example of a plant control system.

The symbol 10 designates an internal combustion engine (hereinafter called "engine") comprising a four-cycle, four-cylinder, DOHC (double overhead cam), gasoline engine. The engine 10 is equipped with an air intake pipe 12. Air sucked into the air intake pipe 12 through an air cleaner (not shown) flows through an intake manifold (not shown). A fuel injector 16 is installed near the intake ports of each of the four cylinders 14 (only one shown). When energized, the injectors 16 inject fuel (gasoline) into the intake air.

When the two intake valves (only one shown) 20 open, the produced air-fuel mixture flows into a combustion chamber 22 to be ignited by a spark plug 24. The resulting explosive combustion drives a piston 26 downward as viewed in the drawing to rotate a crankshaft 30. When the two exhaust valves (only one shown) 32 open, the exhaust gas produced by the combustion passes through an exhaust manifold and an exhaust system 34 connected thereto to be discharged to the exterior of the engine 10 after being purified by a catalytic converter 36.

The engine 10 is equipped with a variable lift mechanism 40 for variably regulating the lift or valve opening height of the intake valves 20 and exhaust valves 32, a variable phase mechanism 42 for variably regulating the phase of an intake camshaft that drives the intake valves 20 (thereby regulating the timing of valve opening and closing), and a variable compression ratio mechanism 44 for variably regulating the compression ratio by changing the top dead center (and bottom dead center) of the pistons 26.

The variable lift mechanism 40 will be explained first.

Figure 2:
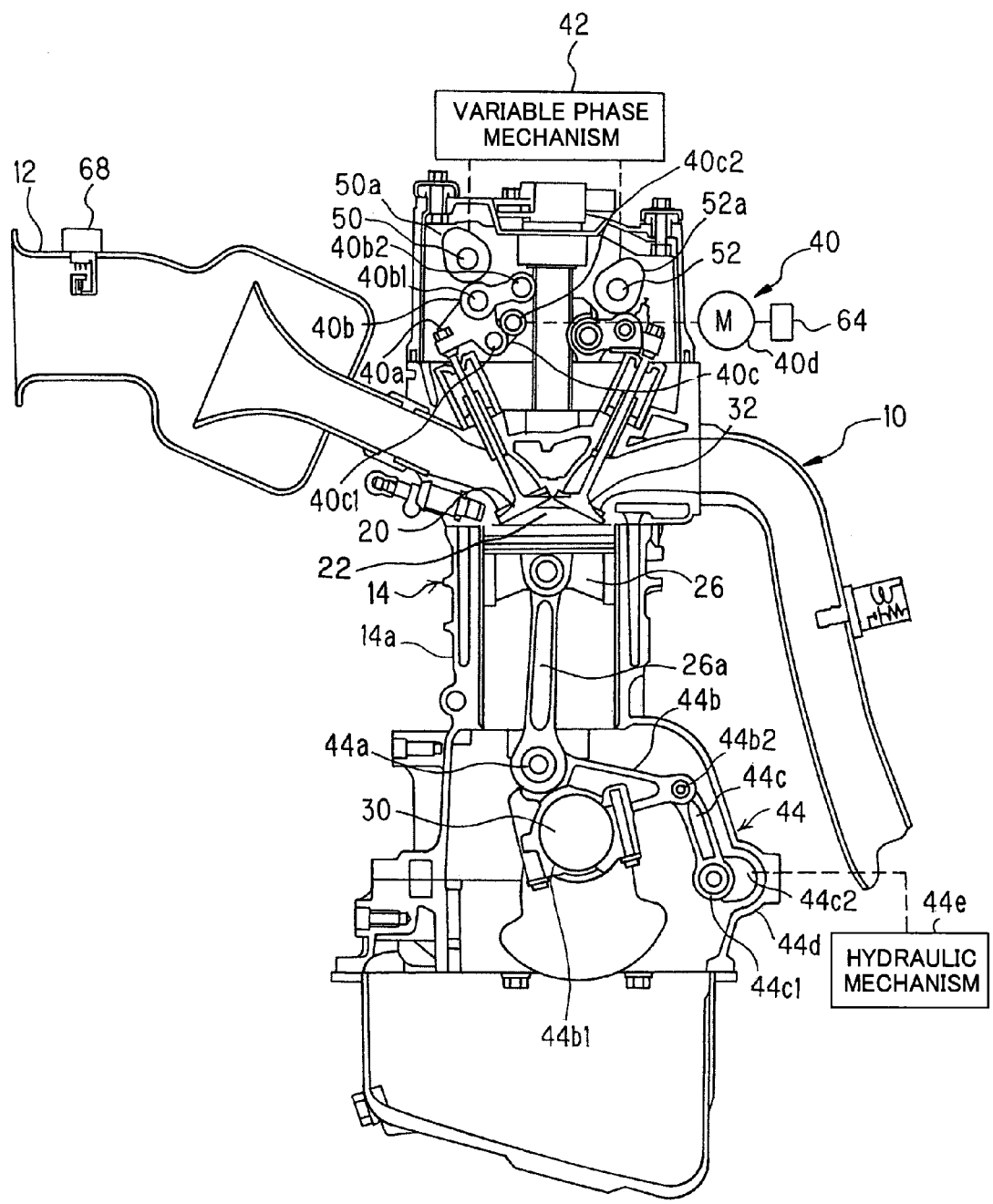
FIG. 2 is a side view concretely showing an internal combustion engine shown in FIG. 1 with focus on a valve operating system.

FIG. 2 is a side view showing the engine 10 of FIG. 1 more concretely with focus on the valve operating system of the engine 10. As illustrated, an intake camshaft 50 and an exhaust camshaft 52 are installed in parallel above the intake valves 20 and exhaust valves 32. They are connected to the crankshaft 30 through timing belts or the like (not shown) so that each is rotated at one-half the rotational speed of the crankshaft 30.

Intake cams 50a are attached to the intake camshaft 50. A rocker arm 40a is provided near each intake cam 50a with its one end in contact with the intake cam 50a and its other end in contact with the tip of the stem of the associated intake valve 20. An upper link arm 40b is connected to the rocker arm 40a by a link pin 40b1 and a lower link arm 40c is connected thereto by a link pin 40c1. The upper link arm 40b is fastened to the cylinder block (engine main body) 14a by another link pin 40b2.

Another link pin 40c2 of the lower link arm 40c is connected to a movable shaft (control shaft; not shown) lying parallel to the crankshaft 30. The movable shaft is connected to an electric motor 40d through reduction gearing (not shown). Rotation of the movable shaft by the motor 40d via the reduction gearing moves the center of rotation where the line connecting link pins 40b1, 40b2 of the upper link arm 40b and the line connecting the link pins 40c1, 40c2 of the lower link arm 40c intersect, thereby changing the distance between the intake cam 50a and rocker arm 40a to change or regulate the value (amount) of lift of the intake valve 20.

The variable phase mechanism 42 will be explained next. The variable phase mechanism 42 is connected to the intake camshaft 50.

Figure 3:
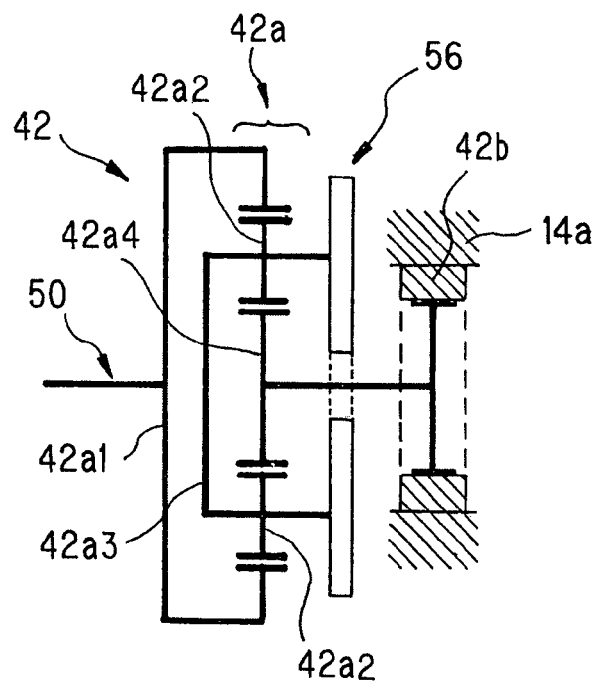
FIG. 3 is a side view schematically showing a variable phase mechanism shown in FIG. 1.
Figure 4:
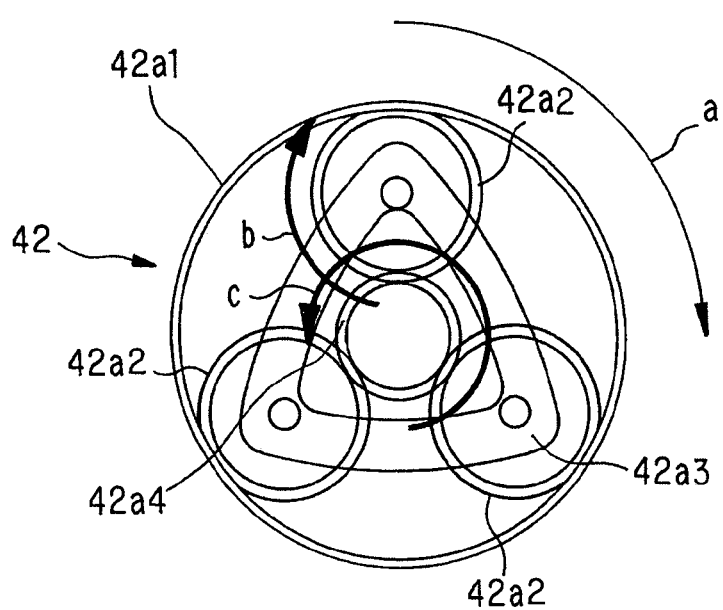
FIG. 4 is a front view showing the variable phase mechanism shown in FIG. 3.
Figure 5:
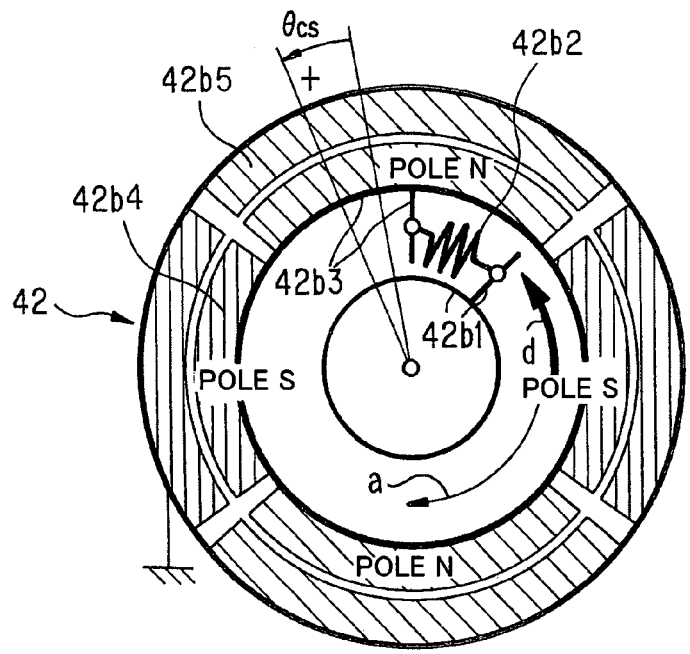
FIG. 5 is a front view schematically showing the structure of an electromagnetic brake in the variable phase mechanism shown in FIG. 4.

FIG. 3 is a side view schematically showing the variable phase mechanism 42, FIG. 4 is a front view thereof and FIG. 5 is a front view schematically showing the structure of an electromagnetic brake therein.

The explanation will be made in reference with FIGS. 3 to 5. The variable phase mechanism 42 is equipped with a planetary gear mechanism 42a and an electromagnetic brake 42b fastened to the cylinder block 14a. A ring gear 42a1 of the planetary gear mechanism 42a is fastened to the intake camshaft 50. Three planetary gears 42a2 mesh with the ring gear 42a1 at intervals of 120 degrees.

As best shown in FIG. 4, the three planetary gears 42a2 are interconnected by a carrier 42a3 having the shape of an equilateral regular triangle in plan view and, as shown in FIG. 3, are connected through the carrier 42a3 to a sprocket 56 that is driven by the crankshaft 30. The carrier 42a3 is connected through a connector 42b1 of the electromagnetic brake 42b shown in FIG. 5 to one end of a return spring (compression spring) 42b2.

A sun gear 42a4 meshes with the three planetary gears 42a2. The sun gear 42a4 is similarly fastened to a connector 42b3 of the electromagnetic brake 42b shown in FIG. 5 and connected through the connector 42b3 to the other end of the return spring 42b2.

As shown in FIG. 5, the electromagnetic brake 42b includes an annular permanent magnet 42b4 located on the outer periphery of the annular connector 42b3 to which the sun gear 42a4 is connected and an annular electromagnet 42b5 located on the outer periphery of the permanent magnet 42b4. The permanent magnet 42b4 has a bipolar structure composed of four magnetic pole pieces arranged with alternating north-south polarities.

The electromagnet 42b5 is composed of four conductors, i.e., laminated steel plates arranged in one-to-one correspondence with the four magnetic pole pieces. The conductors are wound with coils (not shown) that are applied with energizing current by an energizing circuit (not shown) to be magnetized in a polarity depending on the energization direction. Thus the electromagnetic brake 42b resembles a DC motor in structure.

The return spring 42b2 operates through the connectors 42b1, 42b3 to bias the sun gear 42a4 clockwise relative to the carrier 42a3 as viewed in FIG. 5. That is, the sun gear 42a4 is biased in the retard direction, specifically in the direction of retarding the opening (and closing) of the intake valves 20 relative to the rotation of the crankshaft 30.

In the variable phase mechanism 42 of the illustrated structure, the sprocket 56 is rotated one-half turn in the direction of the arrow a in FIG. 4 with rotation of the crankshaft 30. The rotation of the sprocket 56 is transmitted through the carrier 42a3 to the planetary gears 42a2 to rotate them in the direction of the arrow b in FIG. 4. As a result, the ring gear 42a1 and the intake camshaft 50 connected thereto are rotated in the same direction as the direction of rotation of the sprocket 56 (direction of arrow a) and the sun gear 42a4 is rotated in the direction indicated by the arrow c in FIG. 4.

If at this time the electromagnet 42b5 is energized to brake the rotation of the permanent magnet 42b4 connected to the sun gear 42a4 through the connector 42b3, the intake camshaft 50 will be moved relative to the sprocket 56 in the advance direction indicated by the arrow d in FIG. 5 by an amount proportional to the braking force, thereby moving ahead or angularly advancing the contact point between the intake cam 50a and rocker arm 40a relative to the crank angle.

Therefore, when the sun gear 42a4 has rotated relatively by a certain angle to bring the braking force and the return spring force into equilibrium, the planetary gears 42a2 stop operating, so that the sprocket 56 and intake camshaft 50 rotate unitarily while maintaining the certain angle therebetween. In other words, the cam phase is controlled in the advance and retard directions by increasing and decreasing the braking force. Although the detailed description is omitted, the phase, i.e., timing of valve opening and closing of the exhaust valves 32 is variably regulated (controlled) by a similar variable phase mechanism 42 connected to the exhaust camshaft 52.

The variable compression ratio mechanism 44 will now be explained. As shown in FIG. 2, a first link 44b of substantially triangular shape in plan view is connected to a connecting rod 26a of the piston 26 by a link pin 44a.

The first link 44b is formed at a location eccentric or radially offset from the link pin 44a with a hole 44b1 for rotatably accommodating the crankshaft 30 and one end thereof is connected to a second link 44c by a link pin 44b2. A smaller-diameter link pin 44c1 provided at the tip of the second link 44c is eccentrically connected to a larger-diameter movable shaft (control shaft) 44c2 formed at the tip of a third link 44d fastened to the cylinder block 14a.

The movable shaft 44c2 is driven to move by a hydraulic mechanism 44e, thereby at the four-joint linkage composed of the first link 44b, second link 44c and third link 44d, changing the TDC (top dead center; and BDC (bottom dead center)) of the pistons 26 to variably regulate or control the compression ratio of the combustion chambers 22.

The explanation of FIG. 1 will be resumed. A crankshaft sensor 60 installed near the crankshaft 30 outputs a cylinder discrimination signal for specifying the crank angle positions at the four cylinders 14, a TDC signal indicative of a position related to the TDC of the four pistons 26, and a signal indicative of unit crank angles, for example, crank angle signals (CRK signals) produced at every one degree.

A camshaft sensor 62 installed near the intake camshaft 50 (shown in FIG. 2) produces an output or signal at every predetermined angle of rotation, e.g., every one degree of rotation, of the intake camshaft 50. A lift sensor 64 constituted as rotary encoder or the like and installed near the reduction gearing of the motor 40d in the variable lift mechanism 40 produces an output or signal corresponding to the value (amount) of lift or amount of valve opening Liftin of the intake valves 20 owing to the geared-down rotation of the motor 40d. A compression ratio sensor 66 installed near the hydraulic mechanism 44e in the variable compression ratio mechanism 44 uses the detected stroke or amount of rotation of the hydraulic mechanism 44e to produce an output corresponding to the actual compression ratio Cr of the combustion chambers 22.

An airflow meter (AFM) 68 installed near the end of the air intake pipe 12 produces an output or signal corresponding to the intake air quantity Q. A water temperature sensor 70 installed near a coolant channel (not shown) of the cylinder 14 produces an output or signal indicative of the coolant temperature TW of the engine 10.

An in-cylinder pressure sensor 72 fixed by applying pressure near the spark plug 24 disposed at the cylinder head 14a produces an output or signal proportional to pressure (in-cylinder pressure) Pcyl of the combustion chambers 22.

Figure 6:
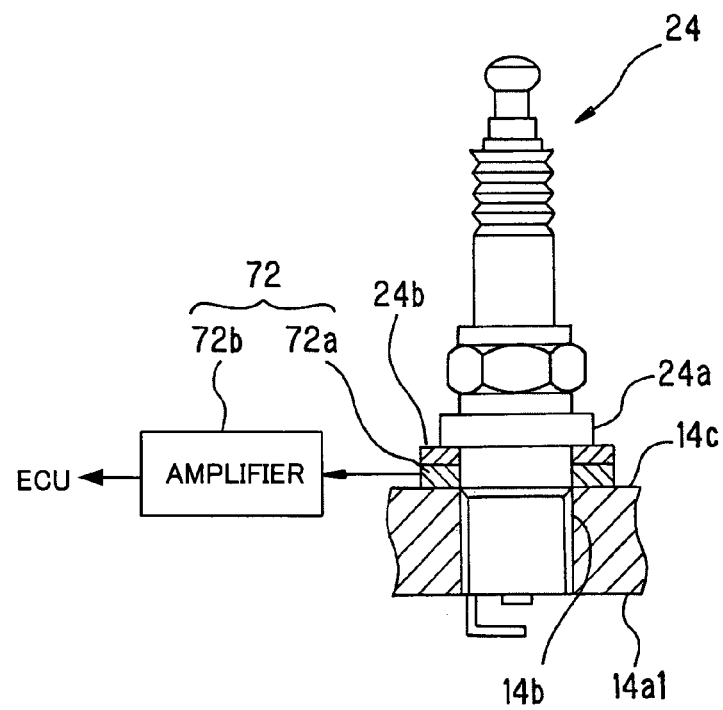
FIG. 6 is a cross-sectional view for explaining installation of an in-cylinder pressure sensor shown in FIG. 1 to a cylinder head.

As shown in FIG. 6, the in-cylinder pressure sensor 72 is equipped with a sensor element 72a composed of a piezoelectric element and an amplifier 72b for amplifying and outputting voltage generated in the sensor element 72a. The sensor element 72a is interposed with a washer 24b to be fixed by applying pressure between a spark-plug installation bearing surface 14c screwed to be fastened into a screw hole 14b of the cylinder head 14a1 and a metal washer 24a of the spark plug 24.

The explanation of FIG. 1 will be resumed. An accelerator position sensor 74 is installed near the accelerator pedal (not shown) provided on the floor near the driver's seat of the vehicle (not shown) in which the engine 10 is mounted produces an output or signal corresponding to the accelerator opening or depression amount AP produced by the driver's depression of the accelerator pedal.

The outputs of the forgoing sensors are sent to an ECU (Electronic Control Unit) 80. As shown in the drawing, the ECU 80 is composed of a microcomputer comprising a CPU 80a, memory 80b, input interface 80c and output interface 80d, and also including an A/D converter circuit, wave-forming circuit, counter and other components that are not shown in the drawing.

The outputs of some sensors, including the crankshaft sensor 60, are wave-formed by the wave-forming circuit, while the outputs of others, including the airflow meter (AFM) 68, are converted to digital values by the A/D converter circuit. The ECU 80 detects the engine speed NE by using the counter to count the CRK signals outputted by the crankshaft sensor 60. In addition, it detects the cam phase Cain (timing of the opening and closing of the intake valves 20) based on the CRK signals and the output of the camshaft sensor 62.

Further, based on the output of the amplifier 72b of the in-cylinder pressure sensor 72 and the CRK signal, the ECU 80 integrates the digital values converted by the A/D converter circuit at every one degree of crank angle to calculate an indicated mean effective pressure Pmi for each cylinder.

The ECU 80 controls the intake air quantity, fuel injection quantity and ignition timing of the engine 10 based on the foregoing values and other sensor outputs, as explained later.

Figure 7:
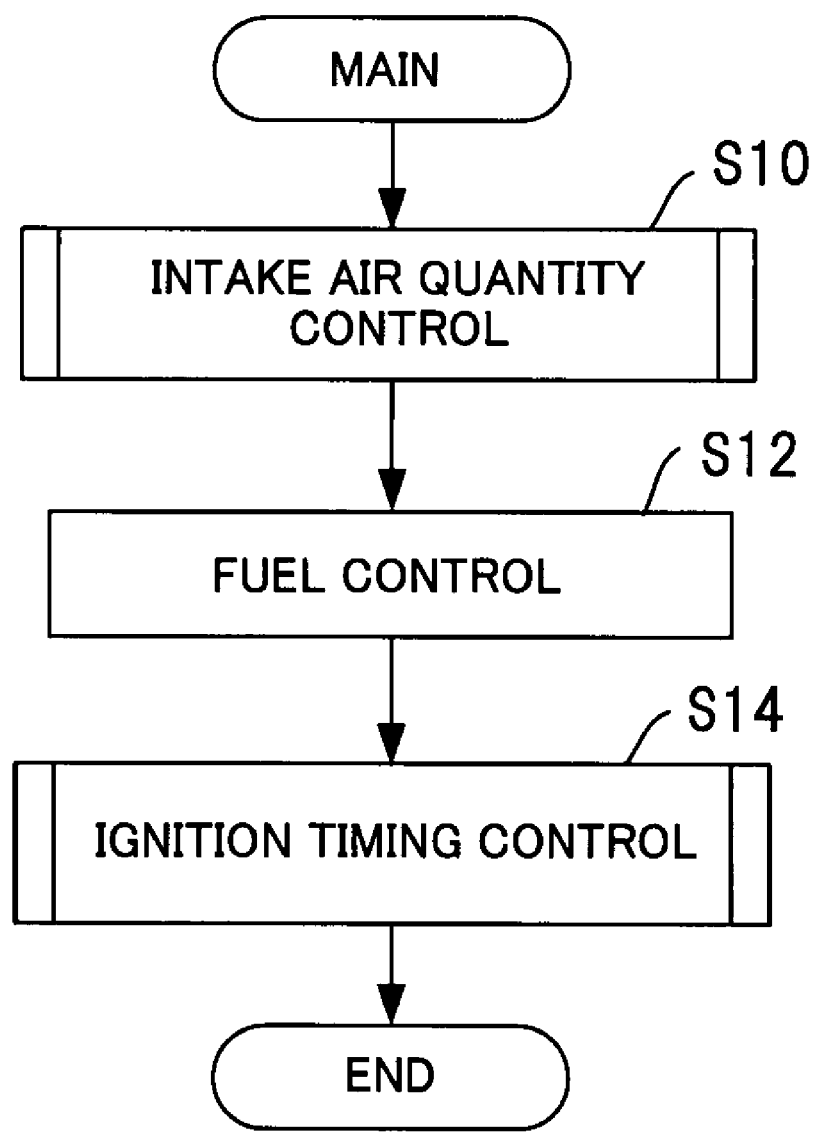
FIG. 7 is a flowchart showing the operation of an ECU shown in FIG. 1.

FIG. 7 is a flowchart showing the processing of the operation of the ECU 80.

In S10, intake air quantity control is conducted. Specifically, based on the operating state of the engine 10 detected from the sensor outputs, the variable lift mechanism 40, variable phase mechanism 42 and variable compression ratio mechanism 44 are controlled to optimize the intake air quantity of the engine 10 under the detected operating state. The processing of S10 starts at starting of the engine 10 and executed at every predetermined interval, e.g., every 10 milliseconds.

Next in S12, fuel control to calculate the fuel injection quantity is conducted based on the controlled intake air quantity, and in S14, the ignition timing is controlled to maximize the indicated mean effective pressure Pmi with respect to the intake air quantity. The processing of S12 and S14 starts at starting of the engine 10 and executed synchronously with the TDC or crank angle thereabout.

Before making the detailed explanation of the operation of the flowchart in FIG. 7, a problem to be solved by this invention will be explained.

Figure 20:
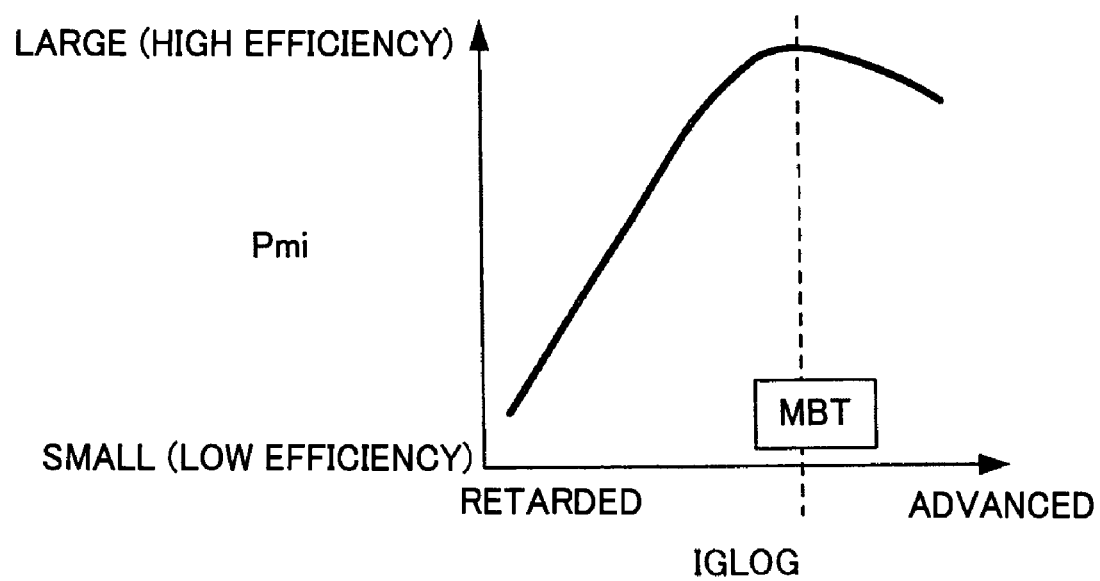
FIG. 20 is an explanatory graph showing the characteristics of indicated mean effective pressure with respect to ignition timing.

As stated in the foregoing, the indicated mean effective pressure has the extremum characteristic with respect to ignition timing, as shown in FIG. 20. When, for example, the ignition timing is controlled at MBT (Minimum Spark Advance for Best Torque) in the engine 10, the indicated mean effective pressure Pmi, which indicates combustion efficiency, becomes optimum. Conventionally, for instance, the technique taught by Patent Reference 1 is proposed to implement such control. However, the prior technique is not necessarily satisfactory in terms of control accuracy and response performance and also disadvantageously cannot compensate a difference between predetermined ignition timing and optimum ignition timing, which occurs due to the manufacture variance or aging of the engine, the change of fuel property or the like.

On the other hand, when outputs of a plant (controlled object) have the maximum/minimum characteristics with respect to the aforementioned inputs, the modern control and robust control (including the sliding mode control) using error to be implemented are not applicable, accordingly it is difficult to achieve a control that optimizes the Pmi (i.e., Pmi optimizing control).

Figure 8:
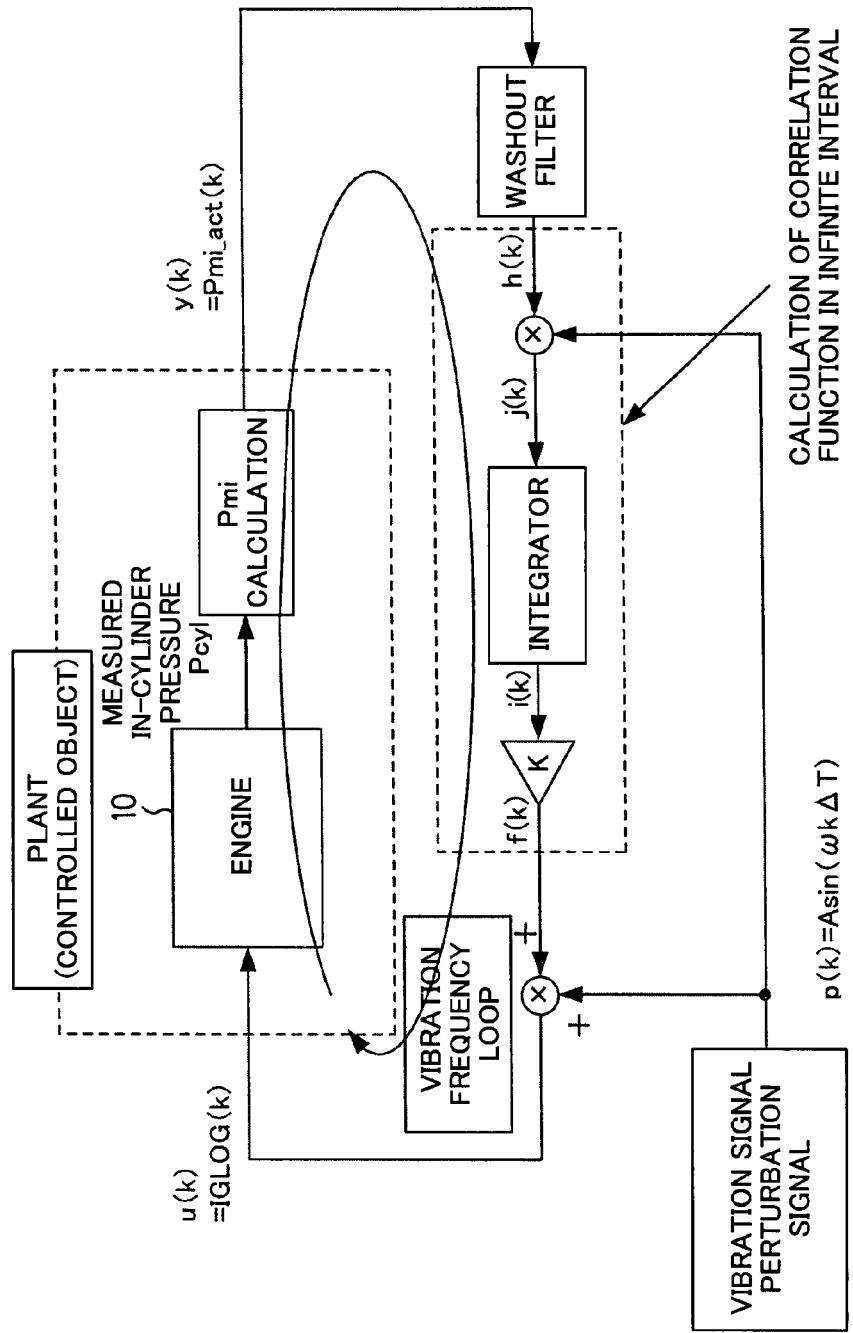
FIG. 8 is a block diagram showing the case that an ESC is applied to a Pmi optimizing control.

The ESC is a control method that can converge an output of a controlled object to the extremum (maximum/minimum value). A block diagram and equations when the ESC is applied to the Pmi optimizing control are shown in FIG. 8 and the following Equations 1-1 to 1-7.

[Numeral 1]

$u(k) = IGLOG(k)$: Control input (Ignition timing in the example) (1-1)
$= f(k) + p(k)$ $y(k) = \text{Pmi\_act}(k)$: Control output (*Pmi* calculation value Pmi_act in the example) (1-2)

$p(k) = A\sin(\omega k \Delta T)$: Vibration input (Perturbation signal) (1-3)

$f(k) = Ki(k)$: Optimizing input estimation value (1-4)

$i(k) = \sum_{I=0}^{k} j(I)$ (1-5)

$j(k) = h(k)p(k)$ (1-6)

$h(k) = 0.5y(k) - 0.5y(k-1)$: Washout filter(*FIR* second-order high-pass filter in the example) (1-7)

$k$: Control time
$\Delta T$: Control cycle
$A$: Vibration input amplitude
$\omega$: Vibration input frequency (Cycle $Tp$)

Figure 9:
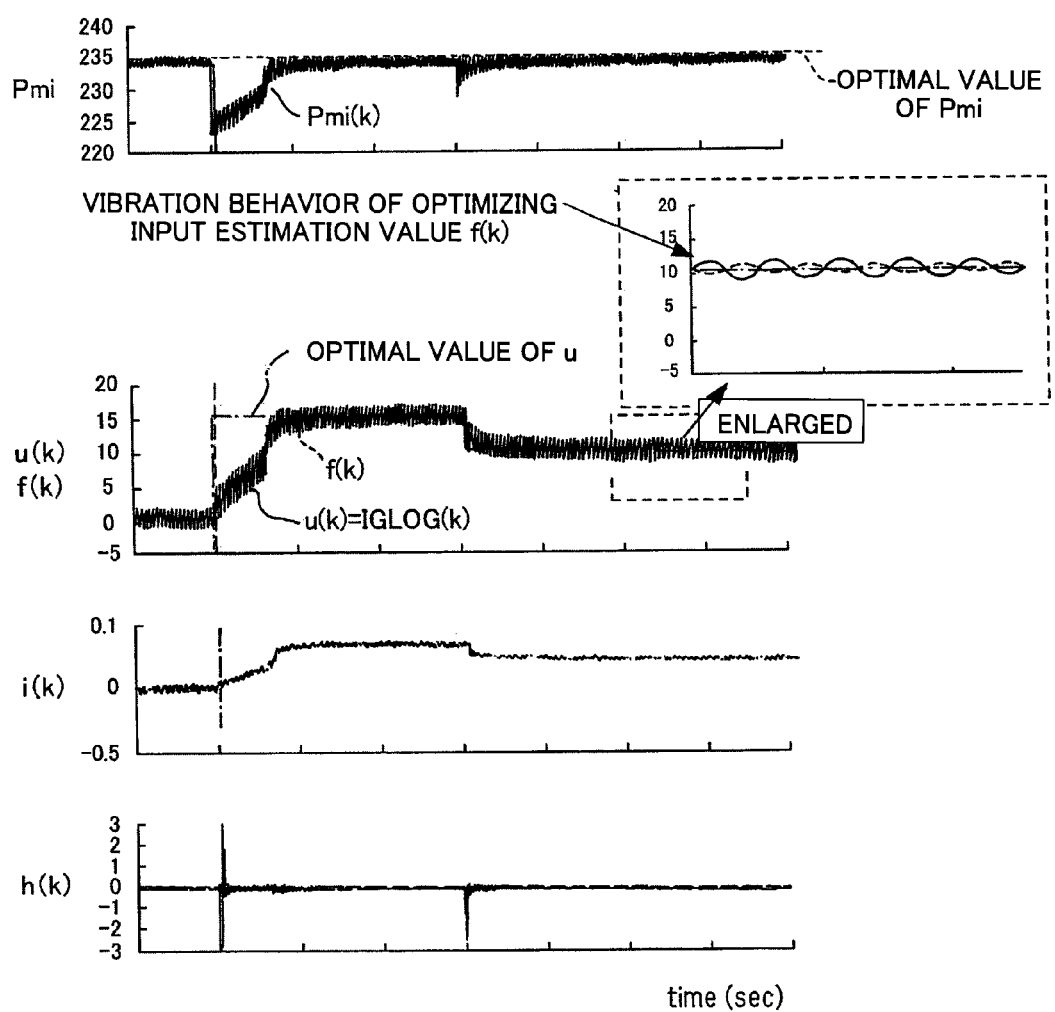
FIG. 9 is a set of data diagrams showing simulation results of a control system shown in FIG. 8.

FIG. 9 is a set of data diagrams showing simulation results of a control system shown in FIG. 8. As is clearly shown in FIG. 9, the control input IGLOG (=u(k)) follows the optimal value and the Pmi (=y(k)), i.e., the control output is converged to the optimal value. Thus the known ESC exhibits a good control performance in the simulation.

However, since the optimizing input estimation value f(k) has vibration behavior as shown in FIG. 9, regression (loop) of the frequency component of the vibration input exists in the control loop, whereby, in the case of controlling an actual controlled object, the regression of the frequency component may cause resonance and make the control condition unstable. This regression of the frequency component is attributable to the fact that the calculation process from h(k) to f(k) in the known ESC is the calculation of a correlation function of an infinite interval, mathematically.

In other words, in the known ESC, an input f for optimizing an output y is calculated by mixing the vibration input p for detecting the relationship between output change and input change with an input u to be sent to the controlled object, multiplying change amount h of the output y at that time by the vibration input p and integrating the product. In this case, the process of calculating f from h is the calculation of the correlation function of the infinite interval of h and p. As a result, the optimizing input f exhibits cyclic behavior and the regression of the cyclic behavior in the control loop causes the resonance of p and f, whereby it may lead to the unstable control system.

An object of this invention is therefore to overcome the foregoing drawback and provide a plant control system, such as the ignition timing control of the internal combustion engine, that optimizes the output y while preventing the resonance of the control system.

First, the characteristics of the correlation function will be explained in order to explain a method to solve the drawback. A correlation function (cross correlation function) F of functions f1 and f2 are generally defined as follows.

[Numeral 2]

$$F(k) = \frac{1}{N+1} \sum_{I=0}^{N} \{f1(I)f2(I)\} \quad (2\text{-}1)$$

The calculation process from h(k) to f(k) in the known ESC (shown in FIG. 8) is equivalent to the case of substituting N with ∞ in the foregoing equation.

Here, f1 and f2 are defined as follows.

[Numeral 3]

$f1(k)=\sin(\omega k \Delta T)$ (2-2)

$f2(k)=\sin(\omega k \Delta T + 2\pi/6)$ (2-3)

N in Equation 2-1 is defined as follows.

[Numeral 4]

$$Tp = \frac{2\pi}{\omega} \neq N\Delta T \quad (2\text{-}4)$$

Figure 10:
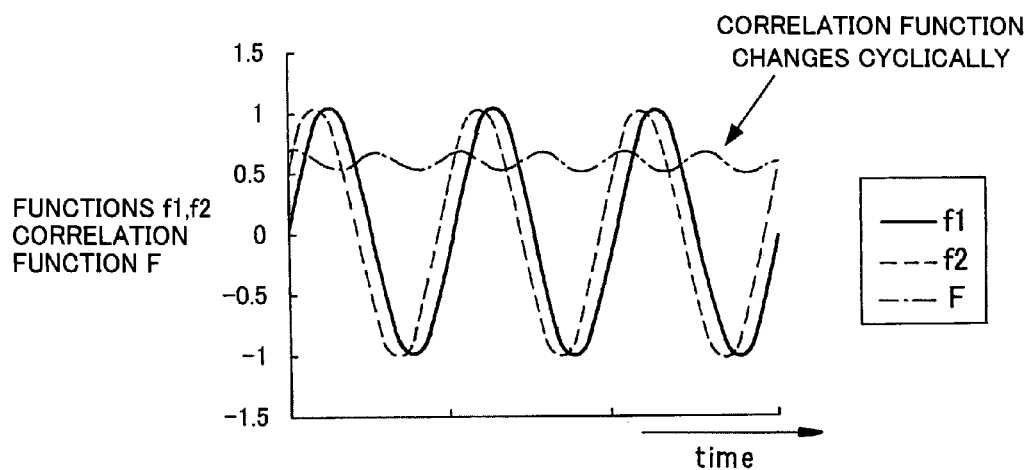
FIG. 10 is an explanatory graph showing a correlation function that is calculated with cycles of functions f1, f2 made different from a calculation interval, in the control system shown in FIG. 8.

Specifically, when the correlation function is calculated with the cycles of the functions f1, f2 made different from the calculation interval of the correlation function, it becomes as shown in FIG. 10. As shown in FIG. 10, when the calculation interval of the correlation function is made different from the cycles of the functions f1, f2, the correlation function F exhibits cyclic change. This cyclic change causes the regression (loop) of the frequency component of the vibration input in the known ESC.

Here, the calculation interval of the correlation function F is made the same as the cycles of the functions f1, f2, i.e., made as shown in Equation 2-5.

[Numeral 5]

$$Tp = \frac{2\pi}{\omega} = N\Delta T \quad (2\text{-}5)$$

Figure 11:
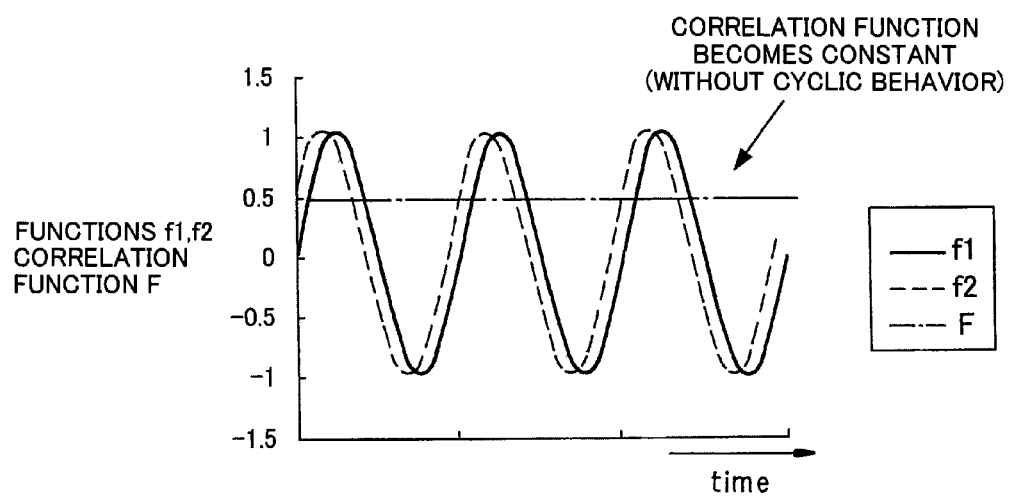
FIG. 11 is an explanatory graph showing the correlation function that is calculated with the cycles of the functions f1, f2 made the same as the calculation interval, in the control system shown in FIG. 8.
Figure 12:
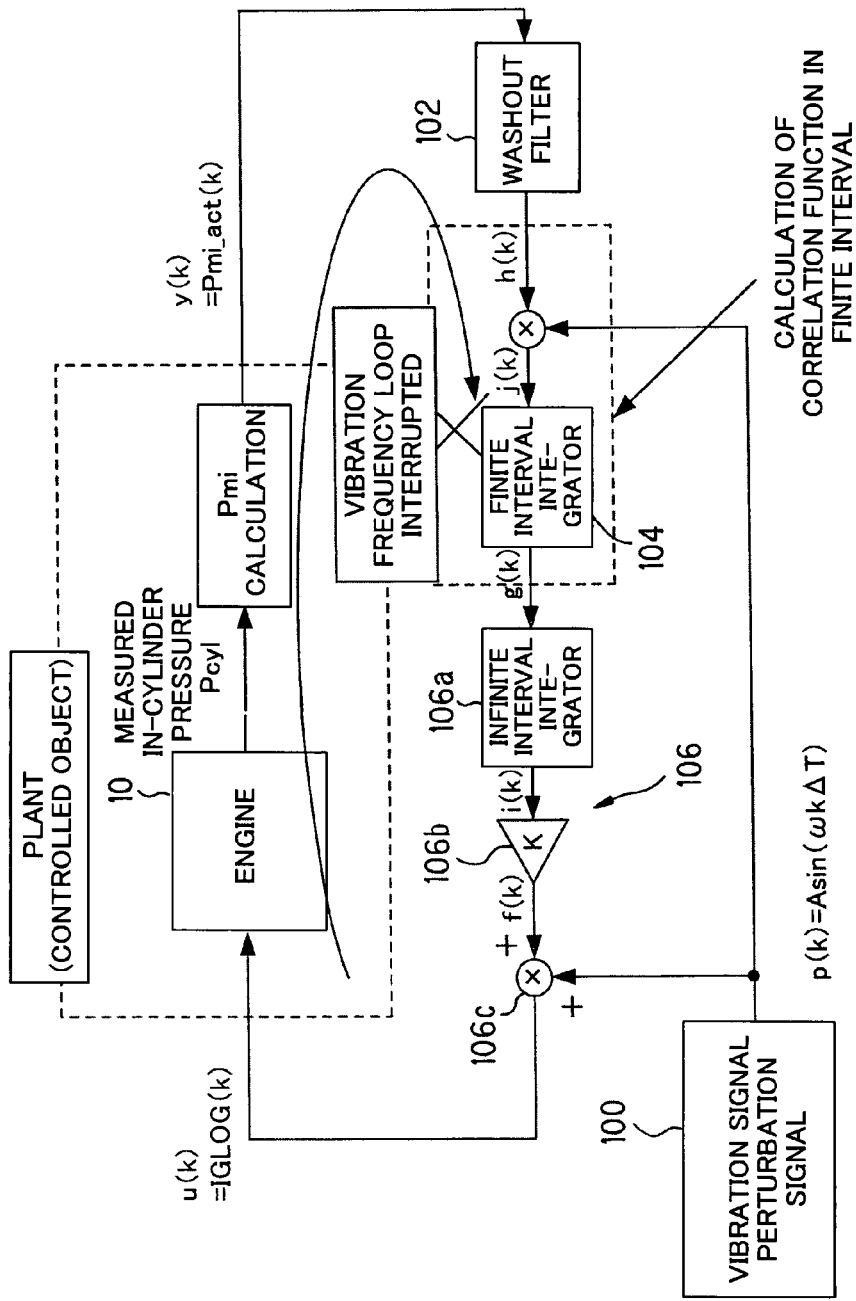
FIG. 12 is a block diagram showing the structure when the ESC shown in FIG. 8 is modified to upgrade.

The calculation result of the correlation function F becomes as shown in FIG. 11. As is clearly shown in FIG. 11, when the calculation interval of the correlation function F is made the same as or integral multiple of the cycles of the functions f1, f2 (generally integral multiple of the cycles), the correlation function F is consistently a constant value and does not exhibit cyclic behavior. With focus on this characteristic of the correlation function, the known ESC is modified to upgrade as shown in FIG. 12 and Equations 2-6 to 2-13.

Figure 13:
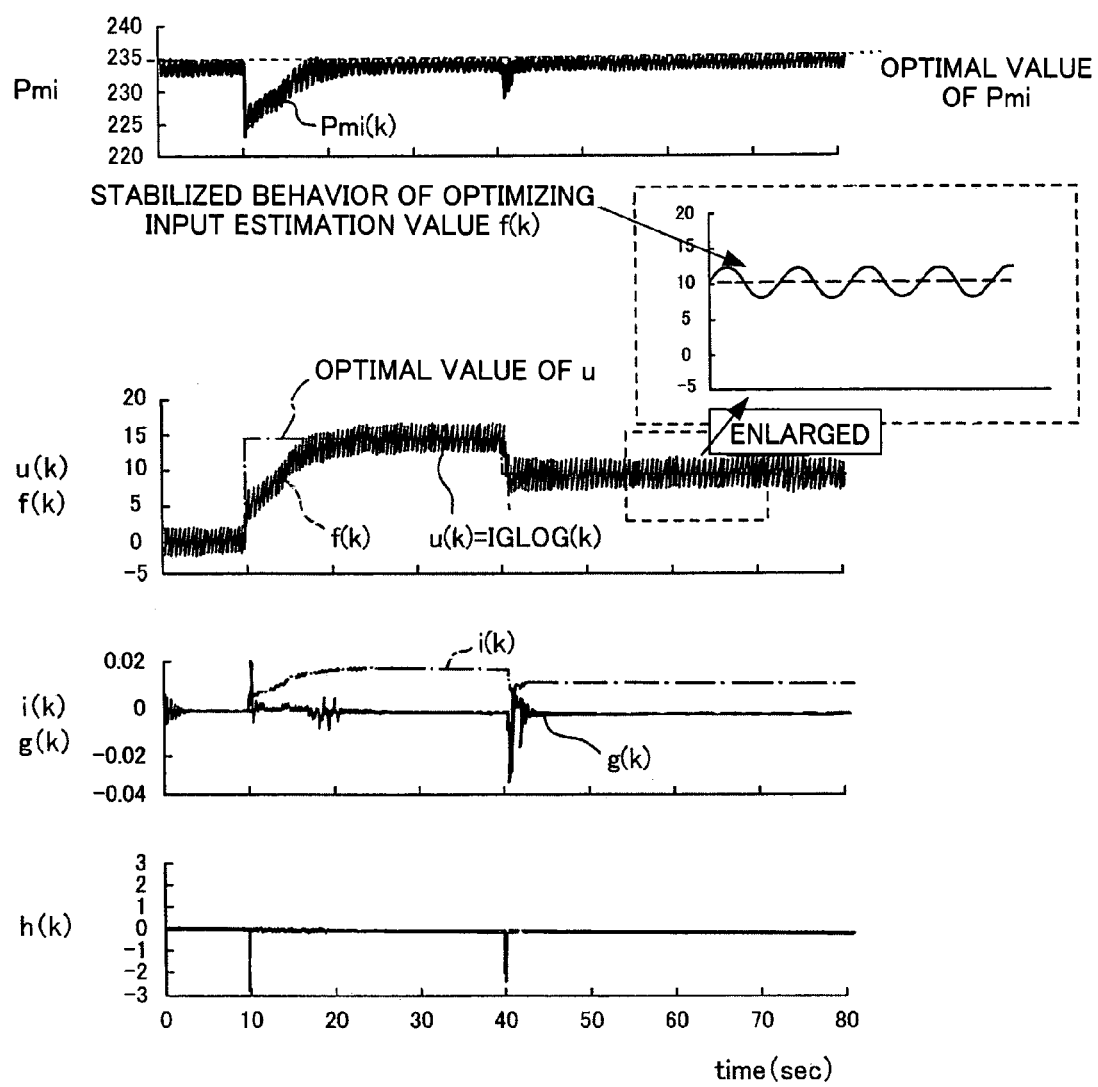
FIG. 13 is a set of data diagrams showing simulation results when using the modified ESC shown in FIG. 12.

In the known ESC, the integral characteristic (steady-state error suppression function) of the optimal control input f and integration of the correlation function calculation are shared. The modified ESC can eliminate such condition and finite interval integration of the cycle Tp of the vibration input is used as integration for the correlation function calculation. FIG. 13 is a set of data diagrams showing simulation results when using the modified ESC. As shown in FIG. 13, the cyclic behavior of the optimal control input f is disappeared, thereby eliminating possibility of the resonance of the control system.

[Numeral 6]

$u(k) = IGLOG(k)$: Control input (Ignition timing in the example) (2-6)
$= f(k) + p(k)$ $y(k) = \text{Pmi\_act}(k)$: Control output (Pmi calculation value Pmi_act in the example) (2-7)

$p(k) = A\sin(\omega k \Delta T)$: Vibration input (Perturbation signal) (2-8)

$f(k) = Ki(k)$: Optimizing input estimation value (2-9)

$i(k) = \sum_{l=0}^{k} g(l)$ (2-10)

$g(k) = \sum_{m=k-N+1}^{k} j(m)$: Finite interval correlation function calculation (2-11)

$j(k) = h(k)p(k)$ (2-12)

$h(k) = 0.5y(k) - 0.5y(k-1)$: Washout filter(FIR second-order high-pass filter in the example) (2-13)

$N$: Finite integration interval $N = \dfrac{2\pi}{\omega \Delta T} = \dfrac{Tp}{\Delta T}$ $\Delta T$: Control cycle $\omega$: Vibration input frequency (Cycle $Tp$)

Thus the plant control system according to the embodiment is configured to comprise a plant (engine) 10 having an input u, applying means (vibration signal) 100 adapted to apply a component p that changes at a predetermined cycle to the plant, parameter calculation means (washout filter) 102 adapted to calculate a parameter h based on an output y of the plant, integration means (finite interval integrator) 104 adapted to integrate a value j obtained by multiplying the calculated parameter h by the applied component p in an interval of integral multiple of a cycle of the component p and input calculation means (infinite interval integrator 106*a*, multiplier 106*b*, addition stage 106*c*) 106 adapted to calculate the input u based on an integrated value g obtained by the integration. The foregoing means correspond to the operation executed by the ECU 80.

On the premise of the foregoing, the explanation of the flowchart in FIG. 7 will be resumed. In S10, based on the operating state of the engine 10 detected from the sensor outputs, the variable lift mechanism 40, variable phase mechanism 42 and variable compression ratio mechanism 44 are controlled so as to regulate the intake air quantity of the engine 10 under the detected operating state.

Figure 14:
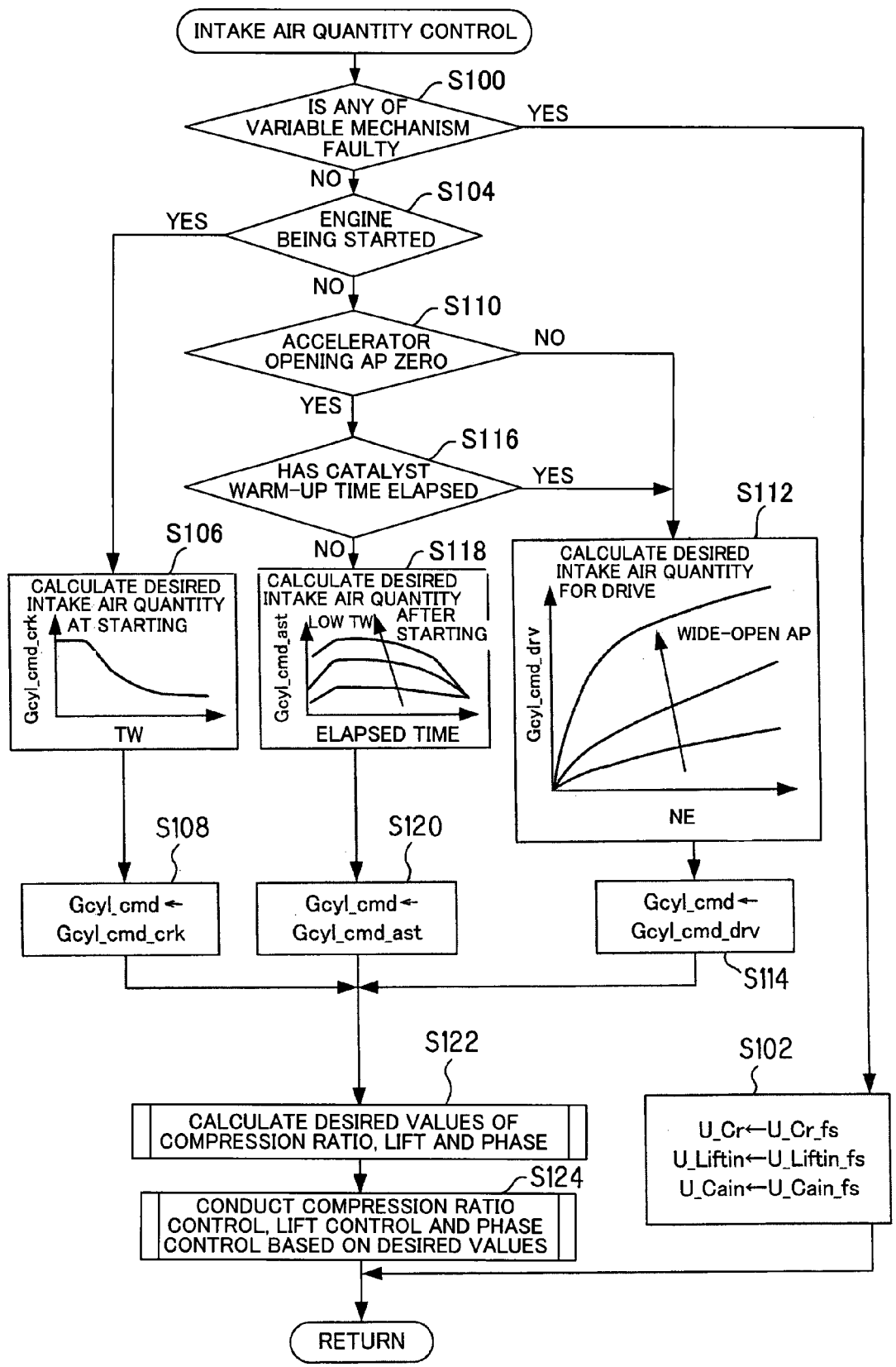
FIG. 14 is a subroutine flowchart showing the proceeding of intake air quantity control in the flowchart of FIG. 7.

FIG. 14 is a subroutine flowchart showing the processing of the operation.

In S100, it is determined whether at least any of three mechanisms, i.e., the valve operating system, namely, the variable lift mechanism 40 and variable phase mechanism 42, and the variable compression ratio mechanism 44, is faulty. When the result is YES, the program goes to S102, in which a command value U_Cr to be supplied to the variable compression ratio mechanism 44 is set to a fail command value U_Cr_fs for establishing the final compression ratio, a command value U_Liftin to be supplied to the variable lift mechanism 40 is set to a fail command value U_Liftin_fs of a level enabling vehicle creep, and a command value U_Cain to be supplied to the variable phase mechanism 42 is set to a fail command value U_Cain_fs that puts the phase on the retard direction (specifically 0 (zero current application)).

When the result in S100 is NO, the program goes to S104, in which it is determined whether the engine 10 is being started. This is determined by checking whether the detected engine speed NE is below the full-firing engine speed.

When the result in S104 is YES, the program goes to S106, in which a desired intake air quantity at starting Gcyl_cmd-_crk is retrieved using the detected engine coolant temperature TW in accordance with the characteristic illustrated in the figure, and to S108, in which the retrieved value is set to a desired intake air quantity Gcyl_cmd.

When the result in S104 is NO, the program goes to S110, in which it is determined whether the detected accelerator opening AP is zero, i.e., whether the accelerator pedal is released. When the result in S110 is NO, which can be taken to mean that the operator wants driving power, the program goes to S112, in which a desired intake air quantity for drive Gcyl_cmd_drv is retrieved using the detected engine speed NE and accelerator opening AP in accordance with the illustrated characteristic, and to S114, in which the retrieved value is set to the desired intake air quantity Gcyl_cmd.

When the result in S110 is YES, which can be taken to mean that the engine 10 is idling, the program goes to S116, in which it is determined whether the warm-up time period of the catalytic converter 36 has elapsed. When the result in S116 is YES, the program goes to S112, in which the desired intake air quantity for drive is calculated in the same manner, as explained above. Since the accelerator opening AP is zero in this case, a desired value for drive is a value farther to the lower-load side, i.e., a smaller value, than the case where the result is YES in S110.

When the result in S116 is NO, the program goes to S118, in which, in order to warm up the catalytic converter 36 faster, a desired intake air quantity after starting Gcyl_cmd_ast is retrieved using the elapsed time since starting of the engine 10 and the detected engine coolant temperature TW in accordance with the illustrated characteristic, and to S120, in which the retrieved value is set to the desired intake air quantity Gcyl_cmd. Since the shown program is commenced with starting of the engine 10 and is executed at every 10 milliseconds, the time elapsed from engine starting can be determined from the number of the executed loops.

Next, in S122, desired values of the variable compression ratio mechanism 44, variable lift mechanism 40 and variable phase mechanism 42, i.e., a compression ratio desired value, lift desired value and phase desired value are determined.

Figure 15:
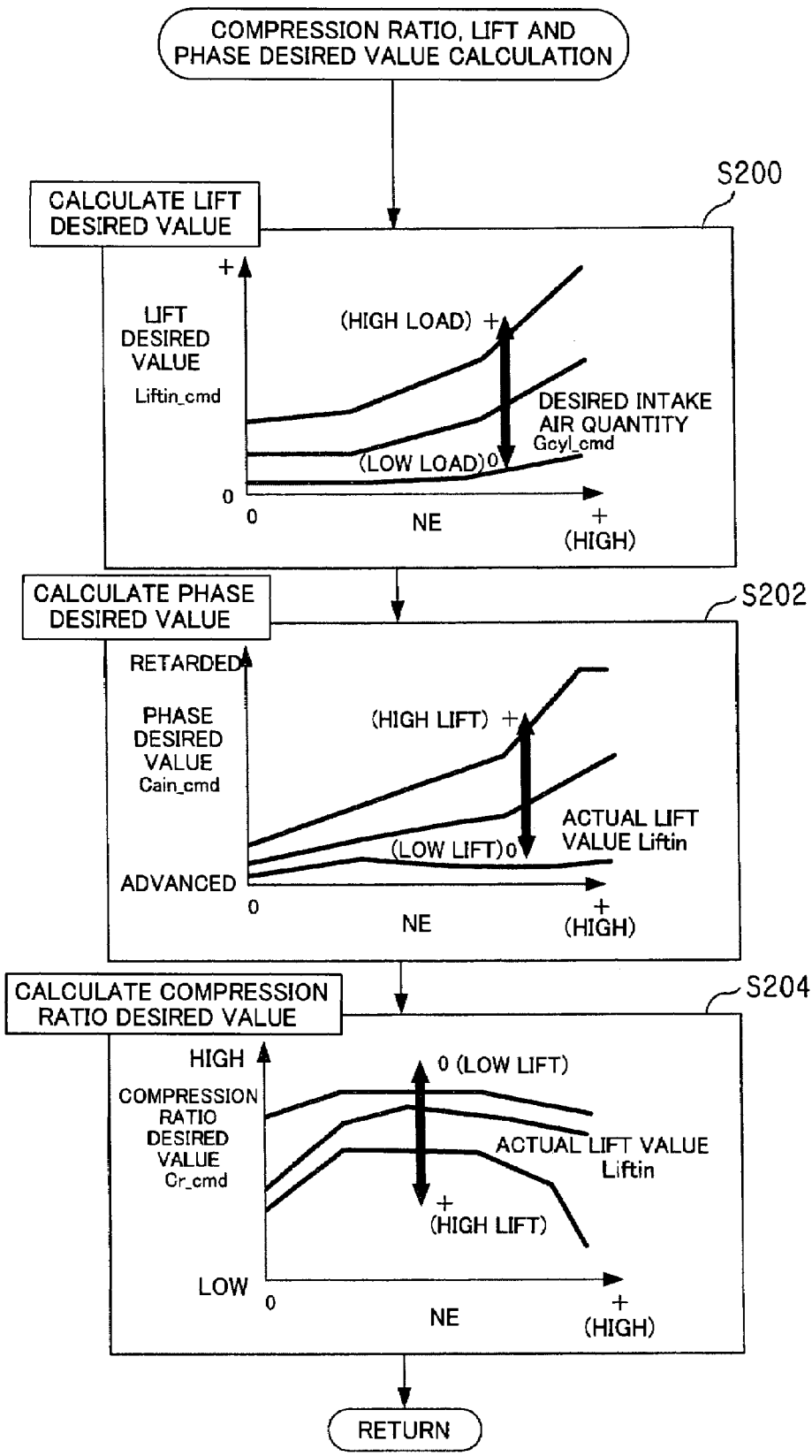
FIG. 15 is a subroutine flowchart showing the proceeding of the calculation of a compression ratio desired value, lift desired value and phase desired value in the flowchart of FIG. 14.

FIG. 15 is a subroutine flowchart showing the processing of the operation.

In S200, the lift desired value Liftin_cmd is calculated using the detected engine speed NE and calculated desired intake air quantity Gcyl_cmd in accordance with the illustrated characteristic. The time period of intake stroke of the engine 10 grows shorter with increasing desired intake air quantity, i.e., as the value moves toward the high-load side, and also with increasing engine speed NE, so that the lift desired value of the intake valves 20 needs to be increased to secure the required intake air quantity.

Next, in S202, the phase desired value Cain_cmd is calculated using the detected engine speed NE and detected actual lift value Liftin in accordance with the illustrated characteristic. The phase desired value is defined here so that as the lift value increases and the engine speed NE increases, the valve opening is increasingly retarded, i.e., the crank angle at which valve opening occurs is increasingly delayed. This is to take advantage that the tendency for the flow rate produced in the air intake pipe during the intake stroke to be maintained also during the first half of the compression stroke increases with increasing engine speed. In other words, the valve opening angle is retarded to keep the intake valves 20 open during the first half of the compression stroke so as to achieve higher charging efficiency.

The valve opening angle is advanced on the low-load side because at low load the intake air quantity can be finely controlled and efficiency can be further improved by increasing overlap to increase the internal EGR amount and reduce pumping loss.

Next, in S204, similarly, the compression ratio desired value Cr_cmd is calculated using the detected engine speed NE and detected actual lift value Liftin in accordance with the illustrated characteristic. The compression ratio desired value is defined to increase with decreasing actual lift value to improve combustion stability. The compression ratio desired value is set to a low value on the low-speed side. This is for reducing the scavenging effect on the low-speed side so as to increase the amount of residual exhaust gas in the cylinders 14 and thereby raise the air-fuel mixture temperature and for reducing flow in the cylinders so as to slow flame speed and thus avoid decrease in knock immunity. Further, the compression ratio desired value is set low on the high-speed side. This is to reduce the amount of ignition timing retard for suppressing knock.

The calculation in S202 and S204 is conducted using the actual lift value so as to avoid interference from the piston 26 and intake valves 20.

The explanation of the flowchart in FIG. 14 will be resumed. Next, in S124, the compression ratio control, lift control and phase control are conducted. Specifically, based on the aforesaid desired values, the variable compression ratio mechanism 44, variable lift mechanism 40 and variable phase mechanism 42 are controlled.

Figure 16:
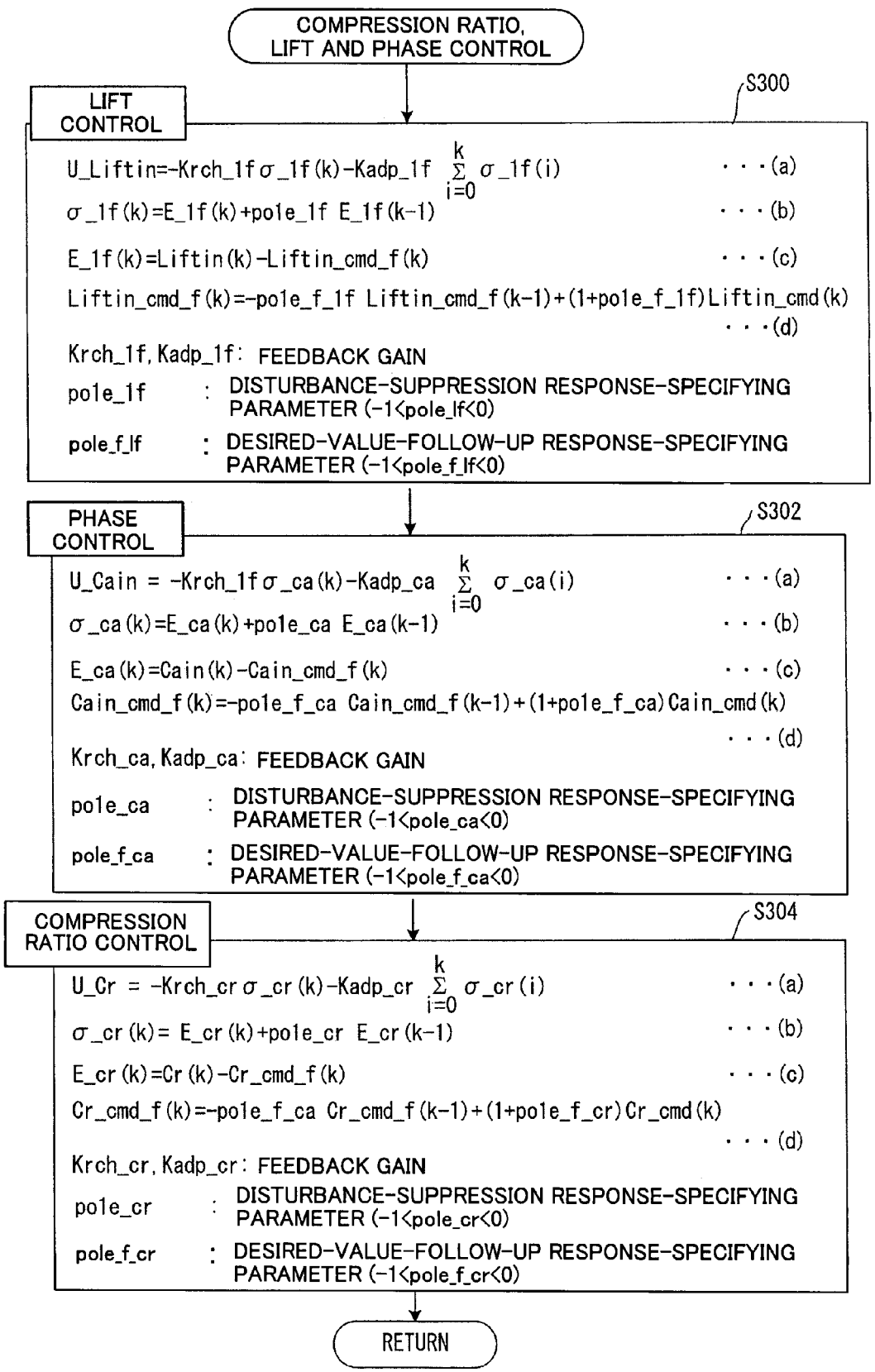
FIG. 16 is a subroutine flowchart showing the proceeding of compression ratio control, lift control and phase control in the flowchart of FIG. 14.

FIG. 16 is a subroutine flowchart showing the processing of the operation.

The control is conducted using simplified two-degree-of-freedom sliding mode control so as to prevent interference from the piston 26 and intake valves 20 caused by overshooting with respect to the desired values.

In S300, the lift command value (controlled variable) U_Liftin is calculated based on the shown equations (a) to (d).

Sliding mode control is the response-specifying control that can specify the controlled variable convergence rate. Two-degree-of-freedom sliding mode control is an extension of sliding mode control that permits the follow-up speed of the controlled variable toward a desired value and the convergence rate of the controlled variable when disturbance is applied to be individually specified.

As shown in the equation (d), the two-degree of freedom sliding mode control uses a desired-value-follow-up response-specifying parameter pole_f_lf to calculate a filter value Liftin_cmd_f(k) of the lift desired value in accordance with a first-order lag filter algorithm. The desired-value-follow-up response-specifying parameter pole_f_lf specifies the follow-up speed of the controlled variable toward the desired value of the controlled variable and, as shown, is set to a value greater than −1 and smaller than 0. The symbol (k) represents a sampling number of the discrete system, more exactly, the execution time of the flowchart in FIG. 7.

Next, as indicated by the equation (c), the filter value Liftin_cmd_f(k) of the lift desired value is subtracted from the lift detected value Liftin(k) to calculate error E_lf(k) and then, as indicated by the equation (b), the product obtained by multiplying the value of the error in the preceding cycle by a disturbance-suppression response-specifying parameter pole_lf is added to the value of the error in the current cycle to calculate a switching function σ_lf(k). The disturbance-suppression response-specifying parameter pole_lf specifies the convergence rate of the error E_lf when disturbance is applied and is set to a value greater than −1 and smaller than 0, as shown in the drawing.

Next, as indicated by the equation (a), the product obtained by multiplying the integral of the switching function σ_lf(k) by a second feedback gain Kadp_lf is subtracted from the product obtained by multiplying the switching function σ_lf (k) by the negative value of a first feedback gain Krch_lf to calculate the lift command value (controlled variable) U_Liftin.

In the equation (a), the first term on the right side is the reaching law input for placing the state on the switching line and, as shown in the figure, is calculated as a proportional term of the switching function. The second term on the right side is an adaptive law input for placing the state on the switching line while suppressing steady-state error and, as shown in the figure, is calculated as the integral term of the switching function. The first and second feedback gains are defined based on simulation, experimentation or the like.

The lift control is simultaneously conducted by operating the motor 40d of the variable lift mechanism 40 based on the calculated lift command value.

Next, in S302, the phase command value (controlled variable) U_Cain is similarly calculated in accordance with the shown equations (a) to (d). Based on the calculated phase command value, the amount of energizing current to be supplied to the electromagnetic brake 42b of the variable phase mechanism 42 is calculated and the electromagnetic brake 42b is operated to perform the variable phase control.

Then the program goes to S304, in which the compression ratio command value (controlled variable) U_Cr is similarly calculated in accordance with the shown equations (a) to (d). Based on the calculated compression ratio command value, the hydraulic mechanism 44e of the variable compression ratio mechanism 44 is operated to perform the compression ratio control.

The calculations of the command values in S302 and S304 are not explained in detail here because they are done in the same way as the calculation in S300, other than for the difference in the subscripts.

The explanation of the flowchart in FIG. 7 will be resumed. The program goes to S12, in which the fuel control is conducted. Specifically, a predetermined characteristic is retrieved using the calculated desired intake air quantity Gcyl_cmd and detected accelerator opening AP, a fuel injection quantity is calculated to achieve the theoretical air/fuel ratio and based on the calculated fuel injection quantity, the injector 16 is driven.

Next, in S14, the ignition control is conducted.

Figure 17:
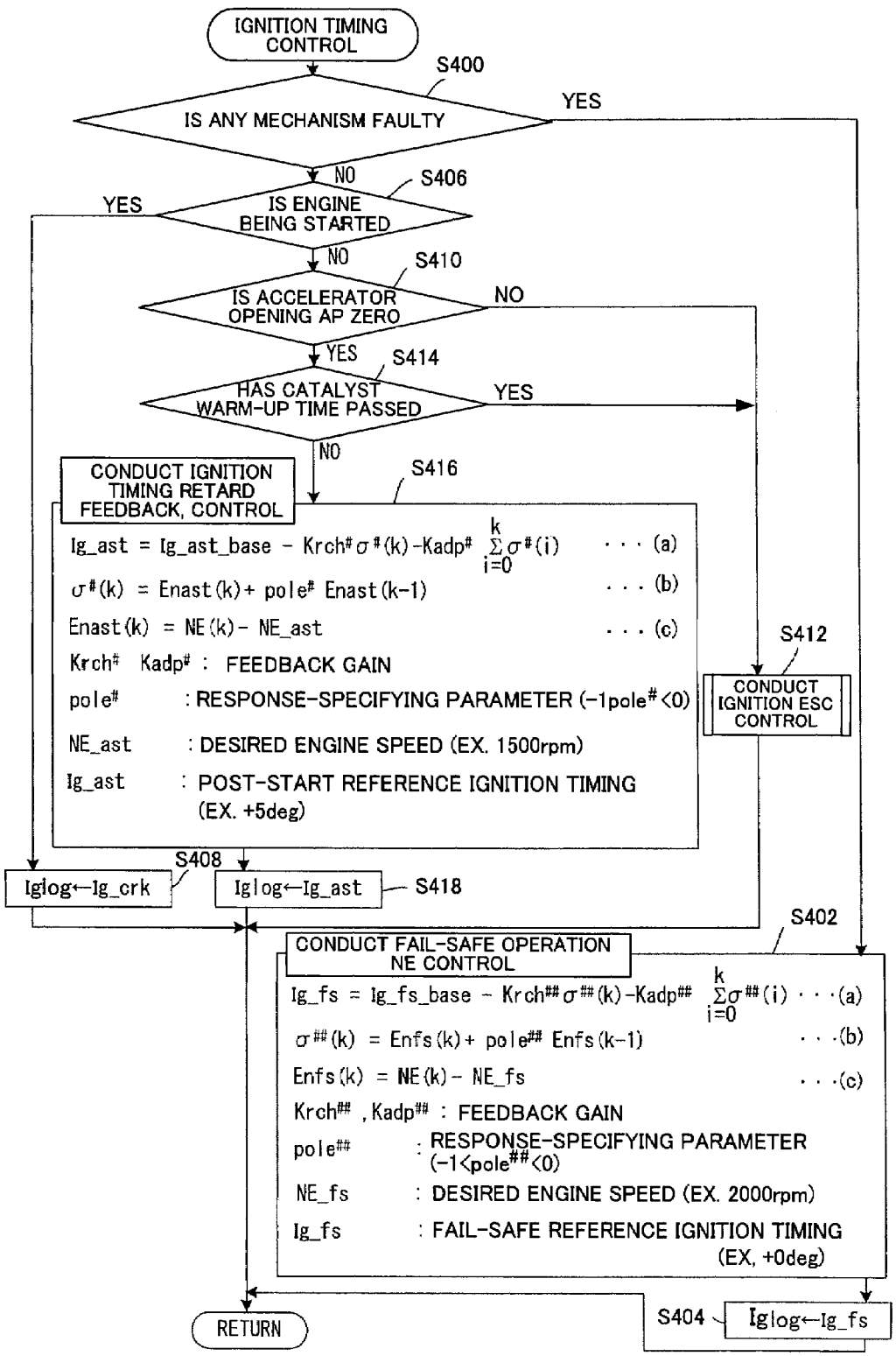
FIG. 17 is a subroutine flowchart showing the proceeding of ignition control in the flowchart of FIG. 7.

FIG. 17 is a subroutine flowchart similar to FIG. 14 showing the processing of the operation.

In S400, similarly, it is determined whether at least any of three mechanisms, i.e., the valve operating system and the variable compression ratio mechanism 44, is faulty. When the result is YES, the program goes to S402, in which fail-safe operation NE control is conducted in accordance with simplified one-degree-of-freedom sliding mode control, similarly to what has been explained with respect to FIG. 16.

Since torque control of the valve operating system is impossible during fail-safe operation, the processing of S402 is implemented for controlling the torque by determining the ignition timing so as to maintain the engine speed NE constant.

First, as indicated by the equation (c), the desired engine speed NE_fs (e.g., 2,000 rpm) is subtracted from the engine speed detected value NE(k) to calculate error Enfs(k) and then, as indicated by the equation (b), the product obtained by multiplying the value of the error in the preceding cycle by a response-specifying parameter pole_## is added to the value of the error in the current cycle to calculate a switching function σ##(k).

Next, as indicated by the equation (a), the product obtained by multiplying the integral of the switching function by a second feedback gain Kadp## is subtracted from the product obtained by multiplying the switching function σ##(k) by a first feedback gain Krch## and the difference obtained is subtracted from a base value Ig_fs_base of fail-safe reference ignition timing Ig_fs to calculate the fail-safe reference ignition timing Ig_fs.

Next, in S404, the calculated fail-safe reference ignition timing is defined as an ignition command value IGLOG.

On the other hand, when the result in S400 is NO, the program goes to S406, in which it is determined whether the engine 10 is being started. When the result is YES in S406, the program goes to S408, in which ignition timing at cranking Ig_crk is set to the ignition command value IGLOG.

When the result in S406 is NO, the program goes to S410, in which it is determined whether the detected accelerator opening AP is zero. When the result is NO, which can be taken to mean that the operator wants driving power, the program goes to S412, in which the ignition command value IGLOG is calculated based on the ignition ESC control, which has been described above.

Figure 18:
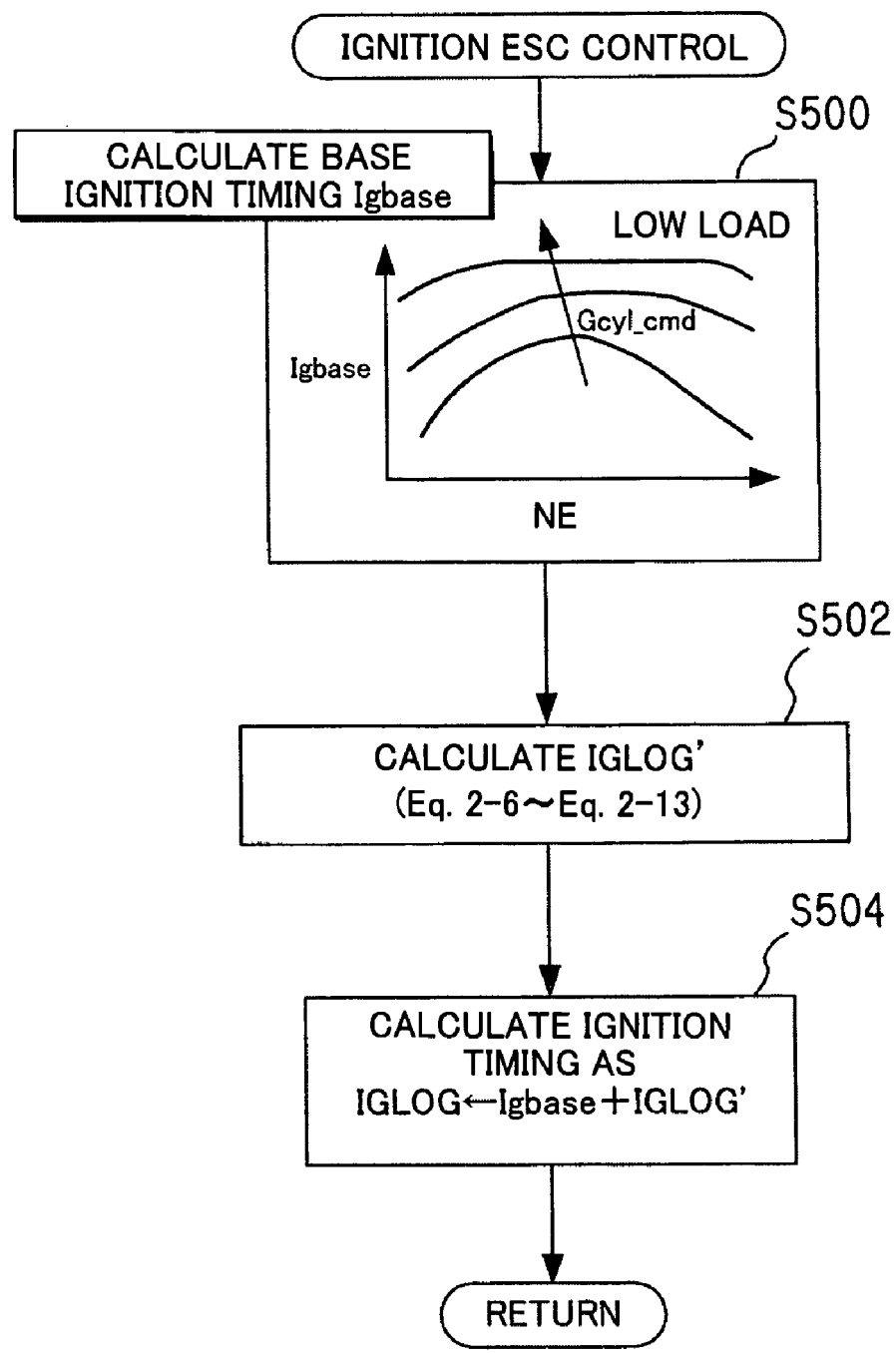
FIG. 18 is a subroutine flowchart showing the proceeding of ignition ESC control in the flowchart of FIG. 17.

FIG. 18 is a subroutine flowchart showing the processing of the operation.

First, in S500, a base ignition timing Igbase is retrieved (calculated) using the detected engine speed NE and calculated desired intake air quantity Gcyl_cmd in accordance with the illustrated characteristic. Since the base ignition timing Igbase has a characteristic that the amount of knock decreases with increasing load (desired intake air quantity), the base ignition timing Igbase is defined to be retarded and because of the same reason, also defined to be retarded at high engine speed region. It is defined to be retarded at the low engine speed region in order to take into account decrease in knock immunity caused by slow flame speed.

Next, in S502, the value IGLOG obtained by the equations 2-6 to 2-13 described above, specifically by the equation 2-6, is replaced with IGLOG' and then in S504, as shown in the figure, IGLOG' is added to the calculated base ignition timing Igbase and the sum obtained is set to the ignition command value IGLOG.

The explanation of the flowchart in FIG. 17 will be resumed. When the result in S410 is YES, the program goes to S414, in which it is determined whether the warm-up time period of the catalytic converter 36 has elapsed. When the result in S414 is YES, the program goes to S412, in which the ignition ESC control is similarly conducted. When the result in S414 is NO, the program goes to S416, in which, similarly to the processing in S402, the feedback control of ignition timing is conducted in accordance with simplified sliding mode control, what has been explained in reference to FIG. 16.

First, as indicated by the equation (c), the desired engine speed NE_ast (e.g., 1,500 rpm) is subtracted from the engine speed detected value NE(k) to calculate error Enast(k) and then, as indicated by the equation (b), the product obtained by multiplying the value of the error in the preceding cycle by a response-specifying parameter pole# is added to the value of the error in the current cycle to calculate a switching function σ#(k).

Next, as indicated by the equation (a), the product obtained by multiplying the integral of the switching function σ#(k) by the second feedback gain Kadp# is subtracted from the product obtained by multiplying the switching function σ#(k) by the first feedback gain Krch# and the difference obtained is subtracted from a base value Ig_ast_base of reference ignition timing after starting Ig_ast to calculate the reference ignition timing after starting Ig_ast (e.g., 5 degrees). The program then goes to S418, in which the calculated reference ignition timing after starting is set to the ignition command value IGLOG.

The further explanation will be made in reference to FIG. 12. The ignition command value IGLOG(k) is sent to the engine 10 as the input u(k), so that the air-fuel mixture in the combustion chamber 22 is ignited, and the indicated mean effective pressure Pmi is calculated at every crank angle of one degree by using the in-cylinder pressure Pcyl measured (detected) over a period before to after the ignition, and the calculation value Pmi_act(k) is sent to the ESC control system as the control output y(k).

In the ESC control system, the vibration input p(k) (=Asin (ωkΔt)) for detecting the relationship between change of the output y(k) and that of the input u(k) is mixed with the input u(k) to be sent to the plant (controlled object). The product obtained by multiplying the change amount h(k) of the output y(k) at the time by the vibration input p(k) is integrated to calculate the input f(k) to optimize the output y(k). More specifically, the shown ESC control system integrates the obtained product to determine in which direction the inclination in the characteristic curve illustrated in FIG. 20 is oriented with respect to the extremum (MBT), and makes the ignition command value IGLOG retarded or advanced relative to the extremum, i.e., to optimize the Pmi.

As explained, since the finite interval integration of the cycle Tp of the vibration input is used as integration for calculating the correlation function, the cyclic behavior of the optimal control input f is eliminated, thereby enabling to suppress the resonance of the control system.

The plant control system according to this embodiment is configured, as stated in the foregoing, to apply the component p that changes at a predetermined cycle to the plant (engine 10) having the input u, calculate the parameter h based on the output y of the plant, integrate the value j obtained by multiplying the calculated parameter h by the applied component p in an interval of integral multiple of a cycle of the component p, and calculate the input u based on the integrated value g thus obtained. Owing to this configuration, it becomes possible to optimize the output y, while preventing the resonance of the control system while, thereby enabling to control the output of the plant to the extremum point.

More specifically, since it is configured such that the plant is the engine (internal combustion engine) 10, the plant input is the ignition timing and the plant output is the parameter indicative of efficiency of the engine (internal combustion engine) 10 (precisely, the indicated mean effective pressure Pmi), in addition to the above effects, it becomes possible to optimize the indicated mean effective pressure Pmi indicative of combustion efficiency and, even when a difference between predetermined ignition timing and optimum ignition timing occurs due to the manufacture variance or aging of the engine 10, the change of fuel property or the like, compensate it to consistently optimize combustion efficiency of the engine.

Second Embodiment

Figure 19:
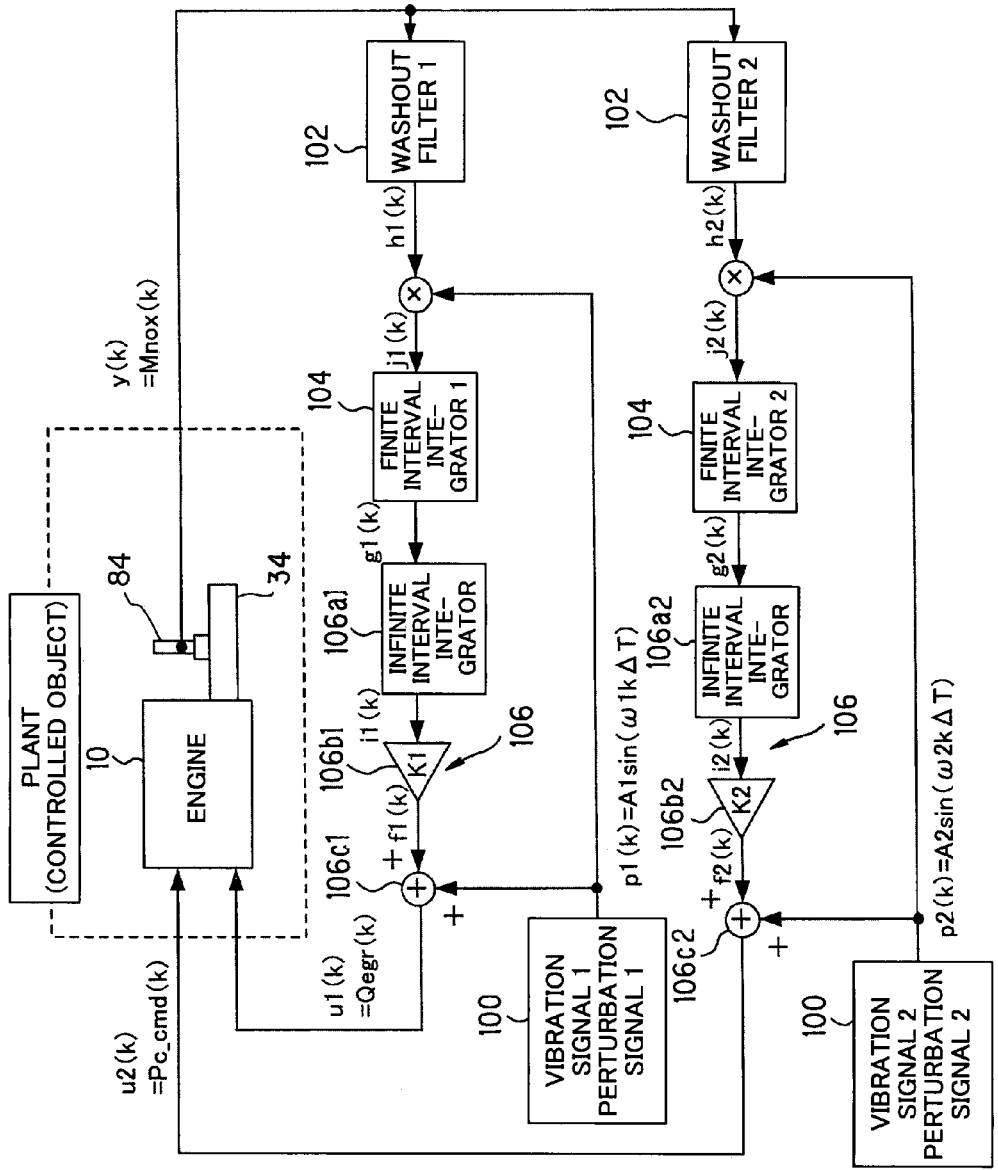
FIG. 19 is a block diagram similar to FIG. 12 but schematically showing a plant control system according to a second embodiment of this invention.

FIG. 19 is a block diagram similar to FIG. 12 but showing a plant control system according to a second embodiment of this invention.

In the second embodiment, an engine control system, more specifically a system that controls an EGR (exhaust gas recirculation) amount Qegr and supercharging pressure Pc to optimize a NOx emission rate Mnox, is taken as an example of the plant control system.

The symbol 10 in the figure designates an engine comprising a four-cylinder diesel engine. In the engine 10, fuel (diesel oil) injected by an injector (not shown) into a combustion chamber spontaneously ignites and burns upon coming in contact with the high-compressed, high-temperature intake air. The exhaust gas thus generated (combustion gas) flows into an exhaust system 34 to be discharged to the exterior of the engine 10.

The exhaust system 34 and intake system (not shown) are interconnected through an EGR pipe (not shown) to implement EGR (Exhaust Gas Recirculation) and a turbine (not shown) installed in the exhaust system 34 drives a compressor (not shown) disposed in the intake system to pump the intake air with supercharging pressure into the combustion chamber. A NOx sensor (exhaust gas sensor) 84 is installed in the exhaust system 34 and produces an output or signal proportional to the NOx component in the exhaust gas.

Thus this invention can be applied not only to the plant (controlled object) with one input and one output as described in the first embodiment, but also to the engine (diesel engine) 10 with two inputs and one output which is configured so that the NOx emission rate Mnox detected by the NOx sensor 84 increases or decreases depending on balance between the EGR amount Qegr and supercharging pressure Pc, as shown in FIG. 19.

In this case, it can be configured such that vibration inputs of different cycles ω1 and ω2 are applied to the two inputs, washout filters 1 and 2 are the band-pass filters whose passing bands are in the vicinity of frequency of ω1 and ω2, respectively, and integration intervals of finite interval integration for calculating correlation functions are cycles of the respective vibration inputs or integral multiple thereof (generally integral multiple of the cycles). The above explanation is represented by the following equations 3-1 to 3-15.

[Numeral 7]

$u1(k) = Qegr(k)$: Control input (EGR amount)  (3-1)
$= f1(k) + p2(k)$ $u2(k) = Pc\_cmd(k)$: Control input (desired supercharging pressure)  (3-2)
$= f2(k) + p2(k)$ $y(k) = Mnox(k)$: Control output (NOx emission rate)  (3-3)

$p1(k) = A1\sin(\omega1 k\Delta T)$: Vibration input1 (Pertubation signal)  (3-4)

$p2(k) = A2\sin(\omega2 k\Delta T)$  (3-5)

$f1(k) = K1 i1(k)$: Optimizing input estimation value  (3-6)

$f2(k) = K2 i2(k)$  (3-7)

$i1(k) = \sum_{l=0}^{k} g1(l)$  (3-8)

-continued $i2(k) = \sum_{l=0}^{k} g2(l)$  (3-9)

$g1(k) = \sum_{m=k-N1+1}^{k} j1(m)$: Finite interval correlation function calculation  (3-10)

$g2(k) = \sum_{m=k-N2+1}^{k} j2(m)$  (3-11)

$j1(k) = h1(k)p1(k)$  (3-12)

$j2(k) = h2(k)p2(k)$  (3-13)

$h1(k) = G1(z^{-1})y(k)$: Washout filter  (3-14)

$h2(k) = G2(z^{-1})y(k)$  (3-15)

$N1$: Finite integration interval $N = \frac{2\pi}{\omega1 \Delta T} = \frac{Tp1}{\Delta T}$ $N2$: Finite integration interval $N = \frac{2\pi}{\omega2 \Delta T} = \frac{Tp2}{\Delta T}$ $\Delta T$: Control cycle
$\omega1$: Vibration input frequency (Cycle $Tp1$)
$\omega2$: Vibration input each frequency (Cycle $Tp2$)
$K1, K2$: Feedback gain $G1(Z^{-1})$: Band-pass filter whose passing band is in the vicinity of $\omega1$ $G2(Z^{-1})$: Band-pass filter whose passing band is in the vicinity of $\omega2$ The plant control system according to the second embodiment is thus configured to comprise a plant (engine 10) having a plurality of inputs u1/u2, applying means (vibration signal 1, 2) 100 adapted for applying components p1/p2 that change at different cycles to the inputs of the plant, parameter calculating means (washout filter 1, 2) 102 for calculating a parameter h based on an output y of the plant, integration means (finite interval integrator 1, 2) 104 for integrating a value j obtained by multiplying the calculated parameter h by the applied component p1/p2 in intervals of integral multiple of the cycles of the components p1/p2, and input calculation means (infinite interval integrator 106a1, 2, multiplier 106b1, 2, addition stage 106c1, 2) for calculating the input u1/u2 based on the integrated values g1/g2 obtained by the integration. The foregoing means also correspond to the operation executed by the ECU 80.

The plant control system according to the second embodiment is configured to, in the plant (engine) 10 having a plurality of inputs u1/u2, apply components p1/p2 that change at different cycles to the inputs, calculate a parameter h based on an output y of the plant, integrate a value j obtained by multiplying the calculated parameter h by the applied component p1/p2 in intervals of integral multiple of the cycles of the components p1/p2, and calculate the input u1/u2 based on the integrated values g1/g2 obtained by the integration. Owing to this configuration, it becomes possible to prevent the resonance of the control system while optimizing the output y, thereby controlling the output of the plant to the extremum.

More specifically, since it is configured such that the plant is the engine (internal combustion engine) 10, while the plant inputs are the EGR amount and supercharging pressure and the plant output is the output of the NOx sensor (exhaust gas sensor) 84 installed in the exhaust system 32 of the engine (internal combustion engine) 10, in addition to the above effects, it becomes possible to, even when balance between the EGR amount and supercharging pressure which minimizes the emission amount of exhaust gas such as NOx, HC and the like varies due to the manufacture variance or aging of the engine 10, the change of fuel property or the like, compensate it to consistently optimize combustion efficiency of the engine.

It should be noted that, in the foregoing, although it takes relationship between the ignition timing and indicated mean effective pressure in the gasoline engine as an example of one input and one output in the plant control system, and relationship between balance of the EGR amount related to the supercharging pressure and the NOx emission rate in the diesel engine as an example of two inputs and one output, this invention is not limited thereto.

Further, this invention can be naturally extended to a plant with plural inputs and one output.

Further, the washout filter is used in FIG. 12 and other figures, it may be a high-pass filter or band-pass filter.

Further, the variable lift mechanism 40, variable phase mechanism 42 and variable compression ratio mechanism 44 are not limited to the shown examples.

Further, although the simplified sliding mode control is used to calculate the intake air quantity and the like in the first embodiment, it may be replaced with another sliding mode control, or another control algorithm such as adaptive control or PID control.

Further, the NOx sensor utilized in the second embodiment can be alternatively a HC sensor.

INDUSTRIAL APPLICABILITY

According to this invention, it is configured to apply the component p that changes at a predetermined cycle to the plant having the input u, calculate the parameter h based on the output y of the plant, integrate the value j obtained by multiplying the calculated parameter h by the applied component p in an interval of integral multiple of a cycle of the component p, and calculate the input u based on the integrated value g thus obtained. Since it is configured to integrate in an interval of integral multiple of a cycle of the component p, i.e., integrate in a finite interval, it becomes possible to optimize the output y while preventing the resonance of the control system, thereby enabling to provide the control system that controls the output of the plant to the extremum point.

The invention claimed is:

1. A system for controlling a plant having an input u, comprising:
    applying means for applying a component p that changes at a predetermined cycle to the plant;
    parameter calculating means for calculating a parameter h based on an output y of the plant;
    integrating means for integrating a value j obtained by multiplying the calculated parameter h by the applied component p in an interval of integral multiple of a cycle of the component p;
    input calculating means for calculating the input u based on an the integrated value g obtained by the integrating means; and
    input means for supplying the calculated input to the plant.

2. The system according to claim 1, wherein the plant is an internal combustion engine, the input of the plant is an ignition timing, and the output of the plant is a parameter that represents a efficiency of the engine.

3. A system for controlling a plant having a plurality of inputs u1/u2, comprising:
    applying means for applying components p1/p2 that change at different cycles to the inputs;
    parameter calculating means for calculating a parameter h based on an output y of the plant;
    integrating means for integrating a value j obtained by multiplying the calculated parameter h by the applied components p1/p2 in intervals of integral multiple of the cycles of the components p1/p2;
    input calculating means for calculating the inputs u1/u2 based on integrated values g1/g2 obtained by the integrating means; and
    input means for supplying the calculated inputs to the plant.

4. The system according to claim 3, wherein the plant is an internal combustion engine, the inputs of the plant are an EGR amount and supercharging pressure, and the output of the plant is an exhaust gas sensor installed in an exhaust system of the engine.

* * * * *

UNITED STATES PATENT AND TRADEMARK OFFICE
CERTIFICATE OF CORRECTION

PATENT NO. : 7,698,051 B2 Page 1 of 1
APPLICATION NO. : 11/664703
DATED : April 13, 2010
INVENTOR(S) : Yuji Yasui It is certified that error appears in the above-identified patent and that said Letters Patent is hereby corrected as shown below:

At column 20, Claim 1, lines 15-16, delete
"based on an the integrated" and substitute with
--based on an integrated--

At column 20, Claim 2, line 22, delete
"represents a efficiency" and substitute with
--represents an efficiency--

Signed and Sealed this

Seventh Day of September, 2010

David J. Kappos
*Director of the United States Patent and Trademark Office*